(12) United States Patent
Saliba et al.

(10) Patent No.: US 7,102,845 B2
(45) Date of Patent: *Sep. 5, 2006

(54) SERVO METHODS AND SYSTEMS USING EXISTING DATA STRUCTURES AND MEDIUM EDGE POSITION

(75) Inventors: George A. Saliba, Northborough, MA (US); Leo Cappabianca, Worcester, MA (US); Mitchell R. Steinberg, Upton, MA (US); Faramarz Mahnad, Waltham, MA (US); James Donati, Wilbraham, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/942,658

(22) Filed: Sep. 15, 2004

(65) Prior Publication Data

US 2005/0083602 A1    Apr. 21, 2005

Related U.S. Application Data

(60) Provisional application No. 60/513,156, filed on Oct. 20, 2003.

(51) Int. Cl.
  *G11B 5/596* (2006.01)
(52) U.S. Cl. ............................... 360/77.12; 360/77.03
(58) Field of Classification Search ............. 360/77.12, 360/77.03
  See application file for complete search history.

(56) References Cited

U.S. PATENT DOCUMENTS

| 2,937,239 | A |   | 5/1960  | Walker et al.    |
|-----------|---|---|---------|------------------|
| 3,633,038 | A | * | 1/1972  | Falk ........................ 250/201.1 |
| 3,829,895 | A |   | 8/1974  | Tanaka et al.    |
| 3,919,697 | A |   | 11/1975 | Walker           |
| 3,971,002 | A |   | 7/1976  | Bricot et al.    |
| 4,056,830 | A |   | 11/1977 | Smith            |
| 4,110,799 | A |   | 8/1978  | Bergmans et al.  |
| 4,149,204 | A |   | 4/1979  | Marino et al.    |
| 4,176,381 | A |   | 11/1979 | de Niet et al.   |
| 4,321,634 | A |   | 3/1982  | Lehureau         |
| 4,334,252 | A |   | 6/1982  | Toriu            |
| 4,392,163 | A |   | 7/1983  | Rijckaert et al. |
| 4,422,112 | A |   | 12/1983 | Tanaka           |

(Continued)

FOREIGN PATENT DOCUMENTS

EP    0 854 471 A1    7/1998

(Continued)

OTHER PUBLICATIONS

European Search Report mailed on Mar. 10, 2005 for EP patent application No. 04256387.4, 3 pages.

*Primary Examiner*—K. Wong
(74) *Attorney, Agent, or Firm*—Morrison & Foerster LLP

(57) ABSTRACT

The present invention provides servo systems and accompanying methods for determining the relative position of a transducer head to a magnetic storage tape utilizing existing data structures on the magnetic storage tape and the position of the tape edge. In one example, a method for positioning a transducer head relative to a magnetic storage medium includes sensing a read signal from a read element associated with a transducer head, the read signal in response to a reference data track stored on a magnetic storage medium, optically sensing a position of an edge of the storage medium, and repositioning the transducer head relative to the storage medium in response to the read signal and the position of the edge of the storage medium.

36 Claims, 15 Drawing Sheets

U.S. PATENT DOCUMENTS

| | | | |
|---|---|---|---|
| 4,424,541 A | 1/1984 | Koinuma et al. | |
| 4,439,793 A | 3/1984 | Nater | |
| 4,449,082 A | 5/1984 | Webster | |
| 4,472,750 A | 9/1984 | Klumpp et al. | |
| 4,479,156 A | 10/1984 | Kumagai et al. | |
| 4,502,082 A | 2/1985 | Ragle et al. | |
| 4,539,615 A | 9/1985 | Arai et al. | |
| 4,679,104 A | 7/1987 | Dahlerud | |
| 4,685,005 A | 8/1987 | Fields, Jr. | |
| 4,802,030 A | 1/1989 | Henry et al. | |
| 4,816,939 A * | 3/1989 | Ford et al. | 360/77.03 |
| 4,866,548 A | 9/1989 | Rudi | |
| 4,975,791 A | 12/1990 | Eggebeen | |
| 4,979,051 A | 12/1990 | Eggebeen | |
| 5,050,017 A | 9/1991 | Carr et al. | |
| 5,055,959 A | 10/1991 | Saliba | |
| 5,072,319 A | 12/1991 | Kohri et al. | |
| 5,121,270 A | 6/1992 | Alcudia et al. | |
| 5,126,895 A | 6/1992 | Yasuda et al. | |
| 5,132,861 A | 7/1992 | Behr et al. | |
| 5,257,148 A | 10/1993 | Solhjell et al. | |
| 5,262,908 A | 11/1993 | Iwamatsu et al. | |
| 5,285,331 A | 2/1994 | White | |
| 5,289,328 A | 2/1994 | Saliba | |
| 5,294,791 A * | 3/1994 | Pahr | 250/548 |
| 5,294,803 A * | 3/1994 | Pahr | 250/559.36 |
| 5,371,638 A | 12/1994 | Saliba | |
| 5,426,551 A | 6/1995 | Saliba | |
| 5,448,430 A | 9/1995 | Bailey et al. | |
| 5,452,152 A | 9/1995 | Rudi | |
| 5,488,519 A | 1/1996 | Ishida et al. | |
| 5,523,904 A | 6/1996 | Saliba | |
| 5,563,868 A | 10/1996 | Farnsworth et al. | |
| 5,588,007 A | 12/1996 | Ma | |
| 5,600,500 A | 2/1997 | Madsen et al. | |
| 5,600,505 A | 2/1997 | Ayres | |
| 5,617,269 A | 4/1997 | Gordenker et al. | |
| 5,757,575 A | 5/1998 | Hallamesek et al. | |
| 5,796,537 A | 8/1998 | Goker et al. | |
| 5,815,337 A | 9/1998 | Milo | |
| 5,844,814 A | 12/1998 | Chliwnyj et al. | |
| 5,847,892 A | 12/1998 | Goker | |
| 5,862,014 A | 1/1999 | Nute | |
| 5,940,238 A | 8/1999 | Nayak et al. | |
| 5,949,604 A | 9/1999 | Saliba | |
| 5,973,872 A | 10/1999 | Saliba | |
| 5,973,874 A | 10/1999 | Panish et al. | |
| 5,978,188 A | 11/1999 | Kaaden et al. | |
| 5,982,711 A | 11/1999 | Knowles et al. | |
| 6,005,737 A | 12/1999 | Connolly et al. | |
| 6,018,434 A | 1/2000 | Saliba | |
| 6,061,199 A | 5/2000 | Goker et al. | |
| 6,075,678 A | 6/2000 | Saliba | |
| 6,084,740 A | 7/2000 | Leonhardt et al. | |
| 6,088,184 A | 7/2000 | Hu | |
| 6,108,159 A | 8/2000 | Nute et al. | |
| 6,118,605 A | 9/2000 | Call et al. | |
| 6,128,155 A | 10/2000 | Sugawara et al. | |
| 6,130,792 A | 10/2000 | Goker | |
| 6,134,072 A | 10/2000 | Zweighaft | |
| 6,141,174 A | 10/2000 | Judge et al. | |
| 6,188,532 B1 | 2/2001 | Albrecht et al. | |
| 6,222,698 B1 | 4/2001 | Barndt et al. | |
| 6,236,529 B1 | 5/2001 | Leonhardt et al. | |
| 6,246,535 B1 | 6/2001 | Saliba et al. | |
| 6,275,349 B1 | 8/2001 | Smith | |
| 6,275,350 B1 | 8/2001 | Barndt | |
| 6,285,519 B1 | 9/2001 | Goker | |
| 6,307,718 B1 | 10/2001 | Kasetty | |
| 6,331,920 B1 | 12/2001 | Albrecht et al. | |
| 6,339,522 B1 | 1/2002 | Hoelsaeter | |
| 6,366,422 B1 | 4/2002 | Daniel et al. | |
| 6,433,951 B1 * | 8/2002 | Lubratt | 360/77.12 |
| 6,493,174 B1 * | 12/2002 | Stubbs | 360/77.12 |
| 6,512,651 B1 | 1/2003 | Eifert et al. | |
| 6,545,837 B1 | 4/2003 | Tran | |
| 6,570,731 B1 | 5/2003 | Burke et al. | |
| 6,700,729 B1 | 3/2004 | Beck et al. | |
| 6,768,608 B1 * | 7/2004 | Saliba et al. | 360/77.03 |
| 6,775,092 B1 | 8/2004 | Zweighaft et al. | |
| 6,801,383 B1 | 10/2004 | Zweighaft et al. | |
| 6,839,196 B1 | 1/2005 | Trivedi | |
| 2002/0021524 A1 | 2/2002 | Saliba et al. | |
| 2002/0176200 A1 | 11/2002 | Trivedi | |
| 2003/0043498 A1 | 3/2003 | Johnson et al. | |
| 2004/0042115 A1 | 3/2004 | Saliba et al. | |
| 2005/0083600 A1 | 4/2005 | Mahnad et al. | |
| 2005/0083601 A1 | 4/2005 | Mahnad et al. | |
| 2005/0088770 A1 | 4/2005 | Saliba et al. | |
| 2005/0088776 A1 | 4/2005 | Saliba et al. | |
| 2005/0094308 A1 | 5/2005 | Mahnad et al. | |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 966 127 B1 | 4/2000 |
| EP | 0 996 127 A2 | 4/2000 |
| EP | 0 996 127 A3 | 4/2000 |
| JP | 59-185020 A | 10/1984 |

* cited by examiner

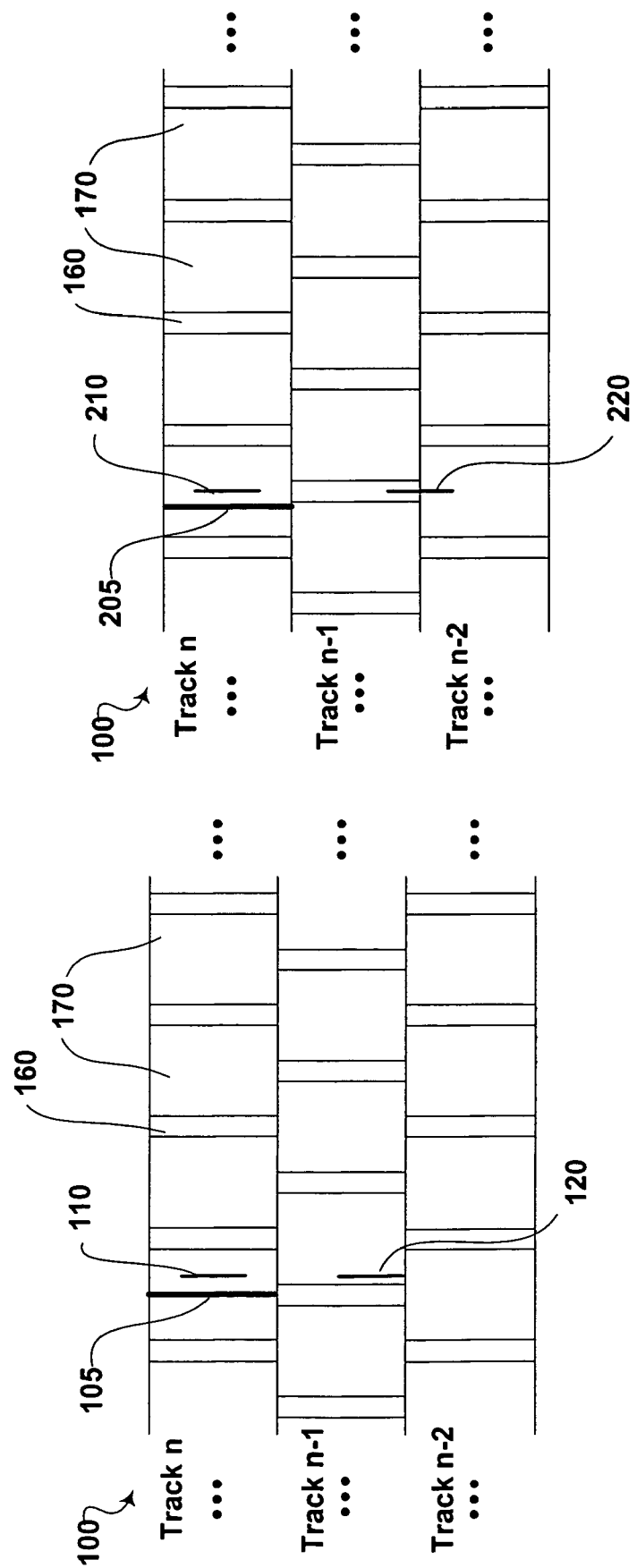

Figure 9B Read signal envelope when centered on track.

Figure 9C Read signal envelope when positioned off-track.

SERVO METHODS AND SYSTEMS USING EXISTING DATA STRUCTURES AND MEDIUM EDGE POSITION

CROSS REFERENCE TO RELATED APPLICATION

The present application claims benefit of earlier filed provisional patent application, U.S. application No. 60/513,156, filed on Oct. 20, 2003, and entitled "SERVO METHODS AND SYSTEMS FOR MAGNETIC RECORDING AND READING," which is hereby incorporated by reference as if fully set forth herein.

BACKGROUND

1. Field of the Invention

The invention and its various aspects relate generally to magnetic tape storage devices and systems, and more particularly to methods and systems for head positioning servo systems.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and the data track can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may intersperse or embed servo information with user data. Exemplary tape drive systems and methods are described, for example, in U.S. Pat. Nos. 6,246,535, 6,108,159, and 5,371,638, and U.S. patent application Ser. No. 09/865,215, all of which are hereby incorporated by reference herein in their entirety.

What is desired are methods and systems for more accurately positioning read and/or write heads with respect to data tracks of a magnetic storage tape in a tape drive, and doing so with increased accuracy and reduced cost and complexity.

BRIEF SUMMARY

One aspect of the present invention provides servo systems and accompanying methods for determining the relative position of a transducer head to a magnetic storage tape utilizing existing data structures on the magnetic storage tape and the tape edge. The exemplary servo system and methods may be used alone or to assist or compliment other servo systems and methods, e.g., optical servo systems and the like as described herein.

In one example, a method for positioning a transducer head relative to a magnetic storage medium includes sensing a read signal from a read element associated with a transducer head, the read signal in response to a reference data track stored on a magnetic storage medium. The method further includes optically sensing a position of an edge of the storage medium, and repositioning the transducer head relative to the storage medium in response to the read signal and the position of the edge of the storage medium.

A characteristic of the read signal may vary as a function of offset between the reference track and the read element thereby providing position information. The characteristic of the read signal may include a quality parametric that varies as a function of the offset, and the transducer head can be repositioned based on the signal quality parametric. The characteristic may include one or more of error signal values, noise signals, average amplitude, average energy, k-bit values, error rate values, and the like.

In one example, the position of the edge of the storage medium may be determined by illuminating a window formed by a transmissive portion of a mask and an edge of the storage medium, wherein the mask is in a fixed spatial relationship to the transducer head, and detecting an intensity of light passing through the window. The head may be repositioned to keep the intensity of light passing through the window substantially constant.

In another example, the position of the edge of the storage medium may be determined by illuminating a first mask and a second mask and detecting an intensity of light passing through the first mask and second mask with a detector, where the first mask is stationary with respect to the transducer head, and the second mask is stationary with respect to the detector.

In another example, the position of the edge of the storage medium may be determined by illuminating an edge of the storage medium to create a diffraction pattern, imaging the diffraction pattern onto a mask, and detecting the diffraction pattern after passing through the mask. A characteristic of the diffraction pattern may provide relative positional information of the storage medium.

According to another aspect of the present invention a servo system is provided. In one example, the system includes a head assembly, a magnetic read element, a light source, a detector, and a controller. The light source illuminates an edge of a magnetic storage medium and the detector detects the light illuminating the edge of the magnetic storage medium. A controller is configured to adjust the position of the transducer head relative to the storage medium based, at least in part, on the detected light associated with the position of the tape edge and a read signal from the read element associated with a reference data track stored on a magnetic storage medium.

In one example, the controller adjusts the position of the transducer head based on one or more characteristics of the read signal. The characteristics may include one or more quality parametrics that vary as a function of offset between the read element and the reference data track.

In one example, the read element is in a spatially fixed relationship to a write element such that alignment of the read element with at least a portion of the reference data track aligns the write element adjacent the reference data track.

Various aspects and examples of the present inventions are better understood upon consideration of the detailed description below in conjunction with the accompanying drawings and claims.

BRIEF DESCRIPTION OF DRAWINGS

FIG. 8 illustrates an exemplary magnetic head assembly relative to a magnetic storage medium and corresponding read signals during a servo process;

FIG. 9A illustrates another exemplary magnetic head assembly relative to a magnetic storage medium and corresponding read signals during a servo process;

FIGS. 9B and 9C illustrate exemplary read signals generated from adjacent data tracks;

DETAILED DESCRIPTION

Figure 1:
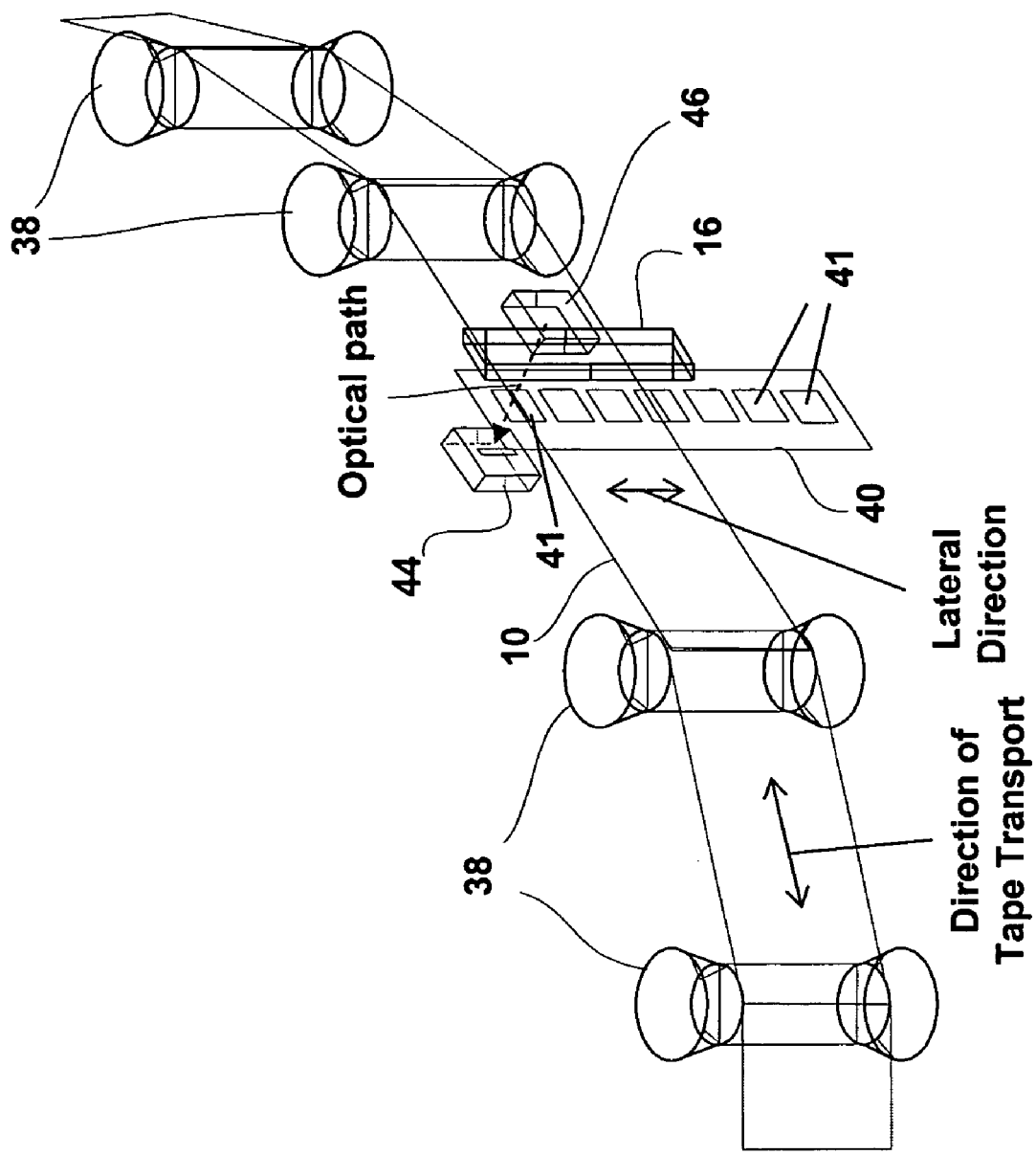
FIG. 1 illustrates an exemplary servo system including an optical servo system configured to sense the edge of a storage medium.

Various methods and systems for sensing lateral tape motion and providing calibration and/or position information for a servo system, e.g., a primary servo or subsystem servo, are provided. The following description is presented to enable a person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a storage tape and data tracks within a tape drive during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the positioning of a transducer head relative to data tracks by utilizing existing data structures on a magnetic storage tape and sensing an edge of the storage tape. The exemplary methods and systems may be used without servo data or separate servo systems including, e.g., mechanical structures to mount an optical system or the like for detecting servo positioning information. With reduced mechanical structure, there may be an increase in servo actuator response, enabling higher actuator band width and finer track width resolution.

Additionally, because the system uses existing (or previously written) data structures and the tape edge for servoing, a drive system may advantageously write to and read from various format storage cartridges and data formats. For example, Super Digital Linear Tape ("Super DLT" or "SDLT") drives, and Linear Tape Open ("LTO") drives may utilize exemplary servo systems that are compatible with both magnetic servo of LTO and optical servo of Super DLT. In one example, a servo system detects at least one previously written data track (referred to herein as a "reference track") to provide positional information for a read/write head relative to a presently accessed track (referred to herein as an "active track"). Additionally, an optical servo system detects at least one edge of the tape to provide relative positional information for the read/write head. The exemplary methods and systems may assist various additional servo system(s) or subsystem(s) of a tape drive to align the read/write head with data tracks during reading or writing processes.

Exemplary tape drive systems and methods that may be used with the various exemplary systems and methods of the present invention are described, for example, in U.S. Pat. Nos. 6,246,535, 6,108,159, and 5,371,638, and U.S. patent application Ser. No. 09/865,215, all of which are hereby incorporated by reference as if fully set forth herein. It will be recognized by those of ordinary skill in the art that various other suitable tape drive and servo systems may be used with one or more of the exemplary systems and methods of the present invention.

In one exemplary servo system, magnetic servo information associated with the relative position of a previously written data structure (e.g., a previously written data track), and optical servo information associated with the relative position of an edge of the magnetic storage medium (e.g., 0.5 inch storage tape), are used to sense relative position of the storage tape and magnetic read/write head. In particular, for a given read/write head geometry, the relative position of the read/write head with respect to a location of the track being accessed for writing or reading data (an active track) can be accurately estimated based on the relative position of the head with respect to the edge of the storage tape and the relative position of a previously written data track (a reference track). The servo system may use the positional information to adjust the relative position of the magnetic read/write head and the tape. In one example, the servo system uses an optical servo method as a primary servo system and magnetic servo of an existing data structure to fine-position the read/write head. The following description details exemplary optical servo methods and exemplary magnetic read servo methods.

Optical Servo Methods and Systems:

The relative position of a read/write head with respect to data track locations can be accurately estimated if the relative position of the read/write head with respect to the edge of the storage medium or tape is known. The relative position of the edge may be sensed relative to the head element with a suitable optical system.

FIG. 1 illustrates one exemplary optical servo system for sensing the relative position of an edge of a storage tape 10. The optical servo system includes a light source 46, stationary optical sensing device 44, and a patterned mask 40 configured to sense the edge of storage tape 10. Storage tape 10 is guided by rollers 38 from a supply reel (e.g., within a cartridge), to a take-up reel (e.g., within a tape drive system) and adjacent read/write head 16 and the optical servo system (generally including light source 46, sensing device 44, mask 40, and a suitable servo controller).

An optical path is shown in FIG. 1 extending between light source 46 and optical sensing device 44. In one example, sensing device 44 includes an area or linear detector aligned along the lateral direction. Sensing device 44 detects light through a window blocked by the optical image of the edge of storage tape 10 on one side and an optically coded mask 40 attached or in a fixed spatial relationship to the read/write head 16 on the other side. Mask 40 includes at least one area of varying transparency to light from light source 46, e.g., aperture 41, and mask 40 is coupled or in a fixed spatial relationship to head 16. During operation, tape 10 will at least partially obstruct the at least one aperture 41 to create at least one window defined by the area of aperture 41 less the area of tape 10 which overlaps aperture 41 along the optical path between light source 46 and sensing device 44. In this example, the lateral length of the aperture is set less than the width of tape 100.

Light source 46 illuminates, e.g., with incoherent light, the at least one window formed by tape 10 and aperture 41. Sensing device 44 detects light passing through the window and provides a measure of the relative position of the edge of tape 10 to the head 16. A controller may adjust the position of head 16 in response to signals from sensing device 44 associated with the detected light. For example, the controller may adjust the position of head 16 to maintain the intensity of the detected light at a particular value, thereby keeping the window at the same or similar size.

In one example, sensing device 44 includes a transmissive optical sensor. Transmissive optical sensors are well established and characterized devices in the industry. They are also relatively inexpensive and readily available, however, various suitable sensors may be used, e.g., CCD or CMOS devices. Changes to the read/write head and tape path assembly in existing drive systems, such as the SDLT drive, are generally minor and inexpensive and will be easily recognized by those of ordinary skill in the art.

EXAMPLE I

To test the feasibility of using a tape edge sensor and track the LTM of a storage tape, an optical servo system including a transmissive optical sensing device similar to that shown in FIG. 1 was attached to an SDLT220 drive, manufactured by Quantum Corporation. The sensing device was positioned such that it monitored the position of the top edge of the tape relative to the position of the read/write head. The gain and offset of the accompanying electronic circuitry were set so that an analog signal was generated with a range of 0 to 3 volts that corresponded to approximately five 24-micron wide SDLT220 format data tracks. The analog signal was used as an input to an A/D converter on the SDLT220 tape drive. Each 0.6 volt change in signal (44 out of 256 A/D bits) represented approximately 24 microns.

Figure 20:
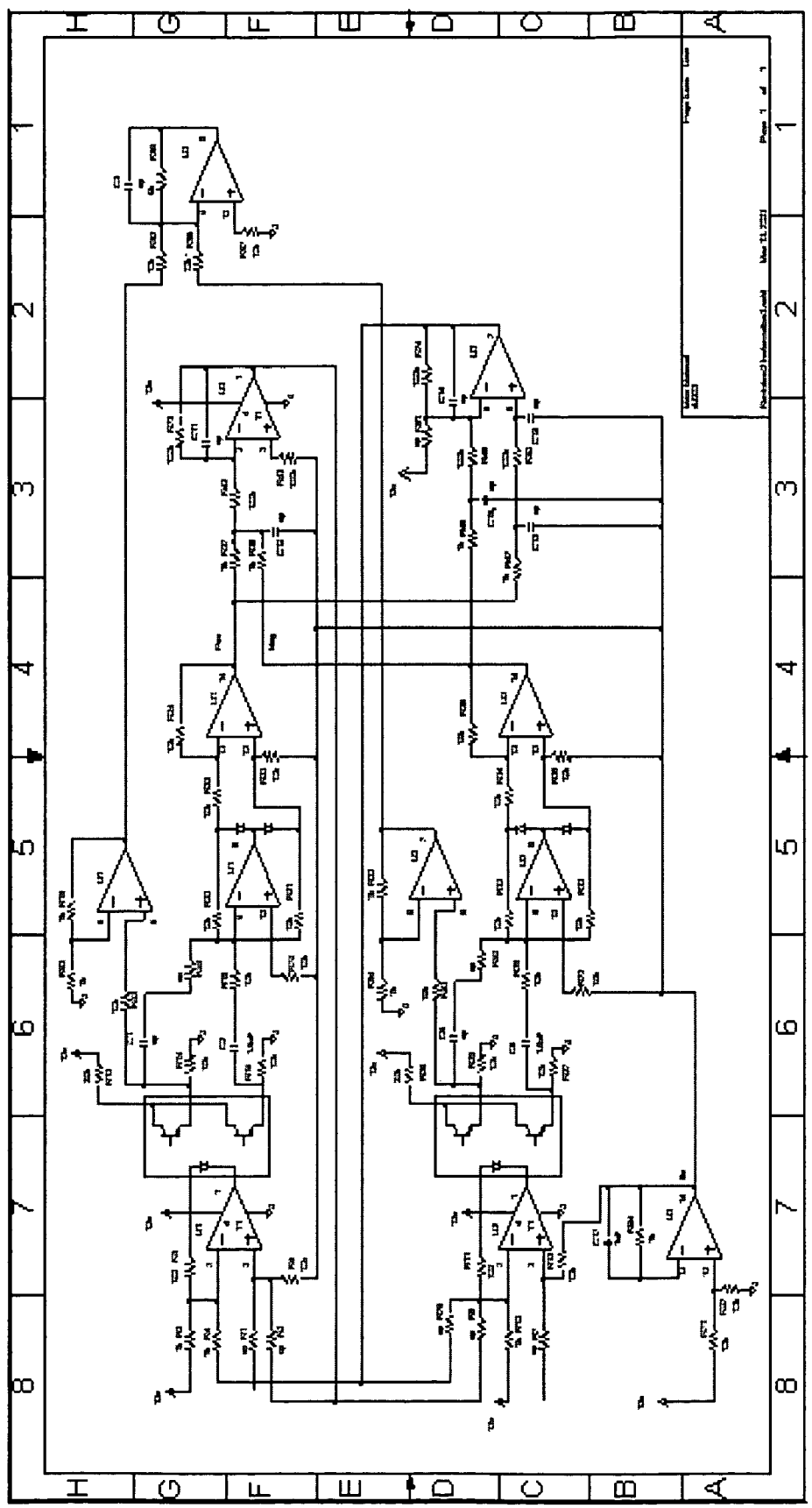
FIG. 20 illustrates an exemplary schematic diagram of circuitry for an optical servo system.

The tape edge sensor signal was calibrated and suitable firmware was written for the SDLT220 to test the ability to track to the tape edge sensor. FIG. 20 is an exemplary schematic diagram of the circuitry used to maintain constant LED light level and to condition the signal for the input to the A/D converter; of course, other designs may be implemented to achieve similar results.

Two Conditions were Tested:

1. The drive was loaded and calibrated with a conventional SDLT220 tape and several data tracks were written in conventional SDLT220 servo mode, i.e., using the optical tracking servo in the drive. The data tracks were then read back by the drive using the optical tracking servo. As the drive was reading, a command sequence was sent to the drive via a diagnostic communication port that switched the drive from using the conventional optical tracking servo to a tape edge servo system (substantially as shown and described in FIG. 1). The drive continued reading the data track within reasonable data error rates using the tape edge servo system. Additionally, the drive was able to alternate between standard optical tracking servo and the tape edge servo system while continuing to read the data.

2. The drive was loaded and calibrated with a conventional SDLT220 tape, where the beginning of each forward data track was written using the conventional SDLT220 optical tracking servo. Part way along the track, a command sequence was sent to the drive via a diagnostic communication port that switched the drive from optical tracking servo to the tape edge servo, and the remainder of the track was written using the tape edge servo. The data tracks were read back using the optical tracking servo for the beginning of each track. Part way through each forward track, a command sequence was sent to the drive via a diagnostic communication port which switched the drive from using the conventional optical tracking servo to the tape edge servo. The drive was able to continue reading the tracks within reasonable data error rates.

In another exemplary optical servo system, an optical sensor and an optically encoded mask attached to the read/write head are provided. In this example, the mask (or masks) includes at least two apertures or transparent portions. The tape, bounded by a first edge, may partially obstruct a first aperture to create a first window, and the tape, bounded by a second edge opposite the first edge, may partially obstruct a second aperture to create a second window. In this manner, if lateral tape motion enlarges the first window, it reduces the second window.

A sensing device may include a first detector for detecting light from the first window, and a second detector for detecting light from the second window. By virtue of the light detected by the first and second detectors, the controller is provided with information concerning relative position of the tape to the read/write head and the direction of motion of the tape with respect to the mask.

A light source may include a first light source for illuminating the first aperture, and a second light source for illuminating the second aperture. The controller may control the first and second light sources to compensate for ambient effects on the determination of the relative position of the tape to the head, such as ambient light and temperature.

The servo system may also include a third aperture in a mask disposed in the lateral direction, and third and fourth detectors. The third detector detects light through the third aperture obstructed by the tape bounded by the first tape edge, and the fourth detector detects light through the fourth aperture obstructed by the tape bounded by the second tape edge. The total light measured by the third and fourth detectors will be substantially constant, assuming no ambient effects, if the tape width is constant. Thus, any change in the total light represents a variation in the tape width due to tape edge irregularities, for example. By virtue of measuring the light with the third and fourth detectors, the controller may compensate for tape edge irregularities.

Figure 2:
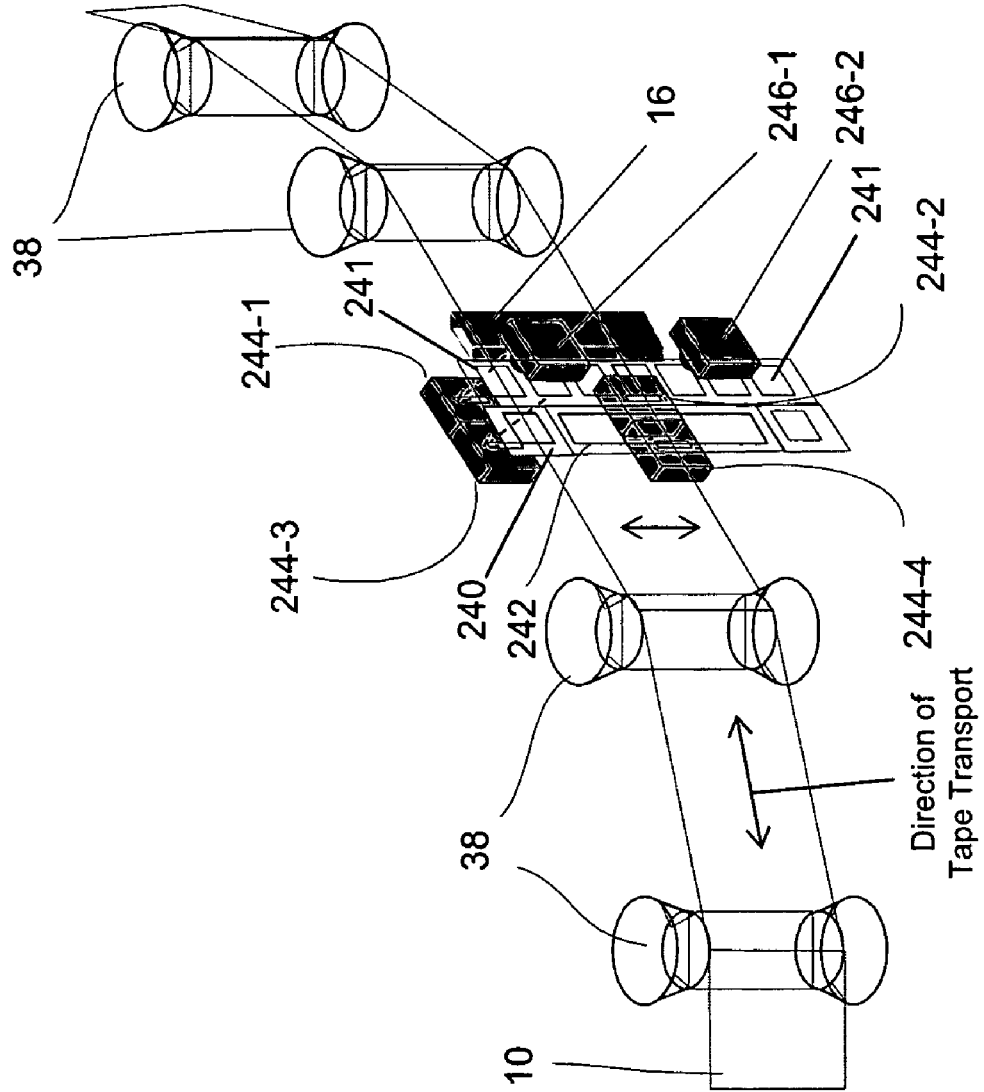
FIG. 2 illustrates another exemplary servo system including an optical servo system configured to sense the edge of a storage medium.

FIG. 2 illustrates an exemplary system having one or more masks with first, second, and third apertures. In particular, optical paths of four optical sensing devices or sensors 244-1, 244-2, 244-3, and 244-4 are at least partially blocked from light sources 246-1 and 246-2 by images of the opposing edges of tape 10; two sensors 244-1, 244-3 aligned with the top edge and two sensors aligned with the bottom edge 244-2, 244-4. An optically coded mask 240 is attached or fixed in place relative to read/write head 16. Sensors 244-1, 244-2, 244-3, 244-4 provide four signals, two of which (sensors 244-1, 244-2) are proportional to the relative position of the head with respect to the edge of the tape 10. The vertical portion of mask 40 corresponding to sensors 244-1, 244-2 includes a column of apertures 241, where each aperture 241 may be shorter in the lateral direction than the width of tape 10. Additionally, sensors 244-3, 244-4 may provide signals proportional to the lateral motion of the tape as registered by the tape edge motion. The vertical mask portion corresponding to sensors 244-3 and 244-4 includes a long vertical aperture 242 that may be longer in the lateral direction than the width of tape 10 and transparent throughout the expected range of LTM. In other example, two or more masks may be used in place of a single mask 240.

The following equations represent the components of motion for each sensor output:

$$b1 = K_{11}*(hp-LTM)$$

$$b2 = K_{21}*(1-hp+LTM)$$

$$b3 = K_{12}*(1-LTM)$$

$$b4 = K_{22}*(LTM)$$

where b1, b2, b3, b4 are the sensor outputs corresponding to sensors 244-1, 244-2, 244-3, 244-4 respectively, and hp and LTM represent the head and tape motions upward in FIG. 2 (normalized to: $0<hp-LTM<1$). $K_{mn}$ represent the gain coefficient for each sensor, which depends on the light source intensity and dimensions of the mask apertures 241, 242. The output value of the sensors also varies as a function of ambient temperature and light intensity. This dependence on the ambient temperature and light should be minimized in order to achieve accurate scaling for the output of the sensors.

Figure 3:
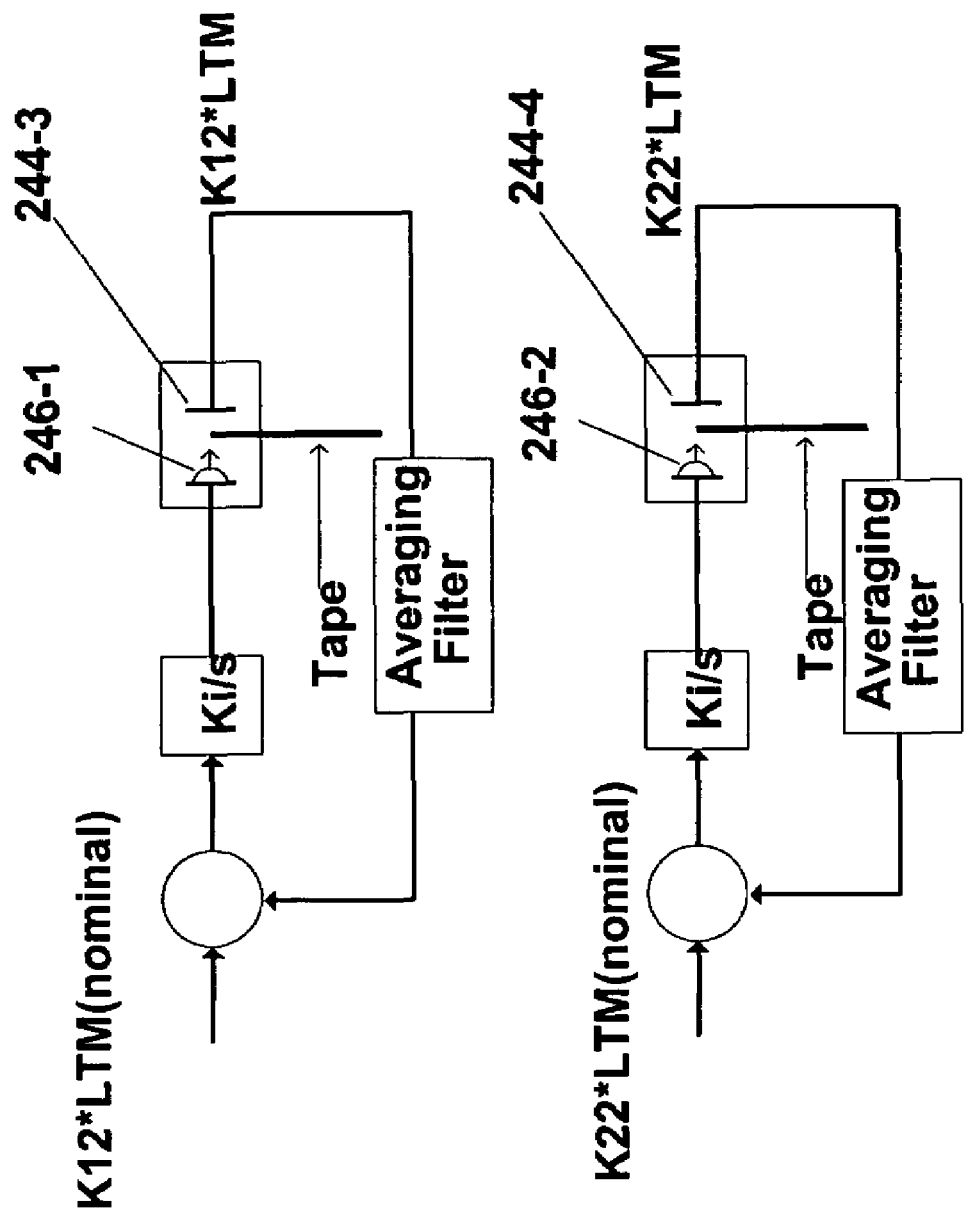
FIG. 3 illustrates an exemplary feedback loop for a servo system.

The mean value of the LTM should remain constant (because the tape is kept stationary with respect to the sensor location) such that the average values of b3 and b4 will remain substantially constant in the absence of ambient temperature and light variation. Therefore, two feedback control loops, e.g., as illustrated in FIG. 3, which would modify the intensity of the light source and keep the average values of b3 and b4 to a nominal value ($K_{12}*LTM$(nominal); $K_{22}*LTM$(nominal)), are sufficient to minimize the sensitivity of $K_{12}$ and $K_{22}$ in the above equations to ambient temperature and light.

Light source 246-1 illuminates both sensors 244-1 and 244-3. Light source 246-2 illuminates both sensor 244-2 and 244-4. Given that the ambient light and temperature variations are substantially the same for 244-1, 244-3 and 244-2, 244-4, the exemplary method will also minimize the sensitivity of $K_{11}$ and $K_{21}$ to these variations. Both $K_{11}$ and $K_{21}$ can be set to equal values by the feedback control loops:

$$K_{12}*LTM(\text{nominal}) = K_{22}*LTM(\text{nominal}), \text{ where}$$
$$K_{12}=K_{22}=Kr; K_{11}=K_{21}=Ks$$

Then the value of Ks in the linear region of the sensor can be determined by the calibration techniques initiated by the servo subsystem.

Therefore a relative position signal, $$Pr = b2-b1 = Ks*(1-2hp+2LTM)$$

represents the resultant relative position of the head with respect to the edge of the tape.

If the tape edge is damaged, however, the sensor signals b1, b2, b3, and b4, individually, will not accurately register the relative head position with respect to the storage tape or data tracks. One exemplary method of improving the accuracy of the positioning signal, in the presence of tape edge damage, is to determine the common and differential components of these signals as a means to distinguish between tape motion, e.g., LTM, and tape edge irregularities from tape edge damage and the like.

For example, if Td1 and Td2 represent the upper and lower tape edge irregularities respectively, then b3 and b4 can be rewritten as:

$$b3 = Kr*(LTM+Td1)$$

$$b4 = Kr*(1-LTM+Td2)$$

Td, the measure of tape edge irregularities is determined by:

$$Td = b3+b4 = Kr(1+Td1+Td2)$$

The Td signal can be monitored in order to apply a filter (such as a low pass filter) to the signal Pr, thus reducing the sensitivity of Pr to Td. For example, the filter could decrease its cutoff frequency in response to increasing Td, thereby reducing the sensitivity of the filtered Pr to the most recent values of Pr that are contaminated by Td.

Those of ordinary skill in the art will recognize that the above example is illustrative only and various other system configurations, feedback methods, and the like are possible. For example, various light sources, optical sensors, masks, feedback loops, etc., may be employed in various numbers and configurations. Additionally, the exemplary methods and systems may be carried out in firmware, software, hardware, or any combination thereof.

Figure 4A:
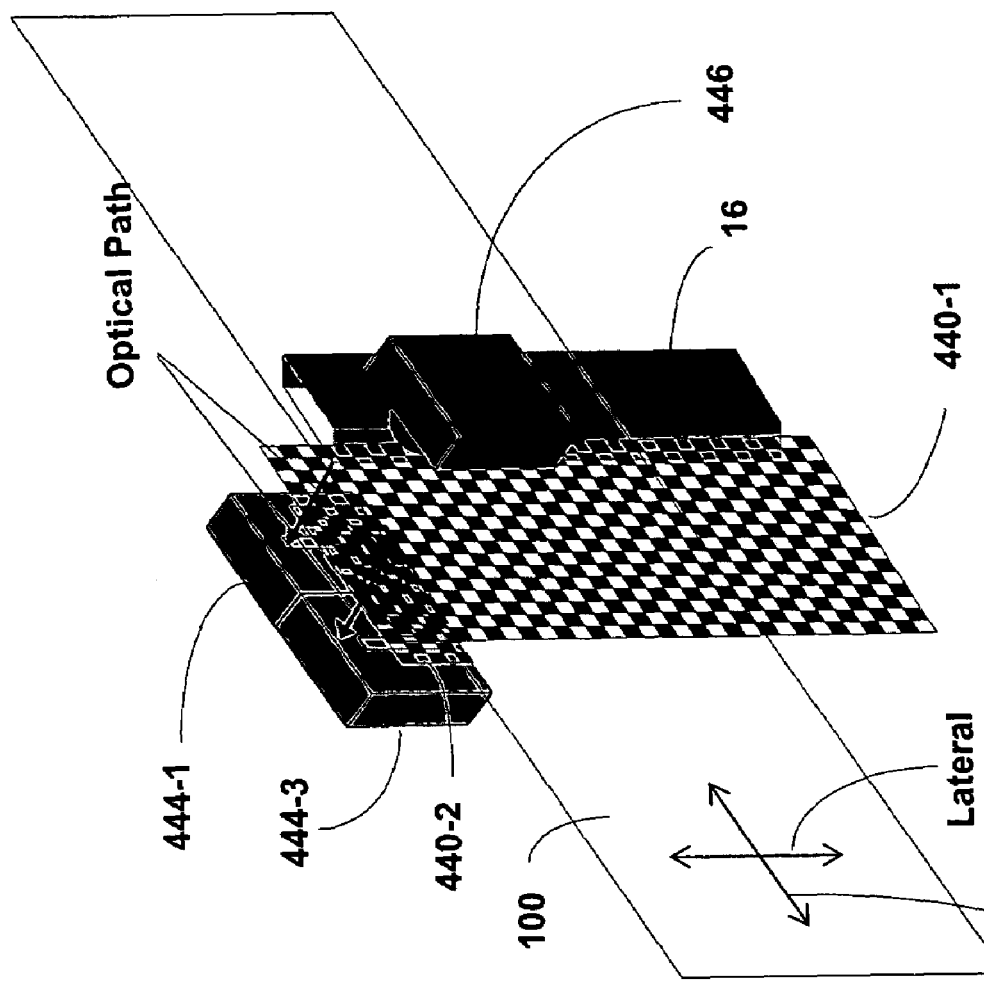
FIGS. 4A, 4B, and 4C illustrate various views of another exemplary servo system including an optical servo system configured to sense the edge of a storage medium.
Figures 4B, 4C:
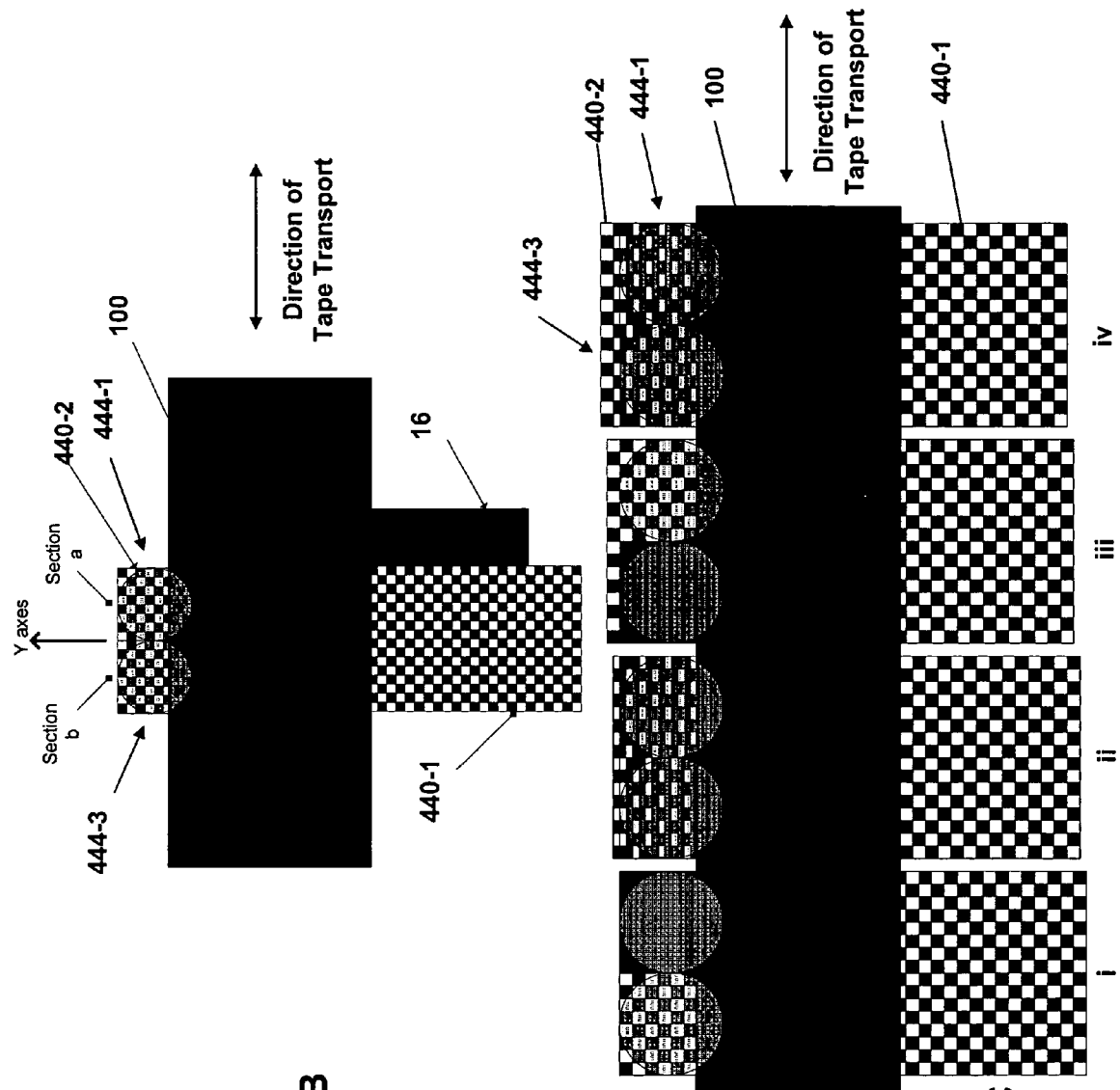

FIGS. 4A, 4B, and 4C illustrate an exemplary optical servo system including two stationary transmissive optical sensors 444-1, 444-3 and two optically encoded transparent masks 440-1, 440-2 provided to determine positional information. One mask 440-1 is coupled to the read/write head and a second mask 440-2 is attached or stationary with respect to the optical sensors 444-1, 444-3. The optical sensors 444-1, 444-3 may be located side-by-side in the longitudinal direction or direction of tape transport. The stationary mask 440-2 includes two side-by-side sections (see FIG. 4B), which may be (at least in part) spatially complementary to each other. For example, one section may be a mirror image of the other section about a y-axis lying in the lateral direction. Stationary mask 440-2 may comprise rows, each row corresponding to a data track on a recording tape, which at least partially obstructs light to the optical sensing elements. In another example, each stationary mask section may comprise a checkerboard pattern of alternating shapes, such as squares or rectangles.

The moving mask 440-1 attached or in a fixed relationship relative to head 16 may include a pattern, such as a checkerboard pattern, corresponding to the pattern on one section of stationary mask 440-2. The moving mask 440-1 may have a width in the longitudinal direction that is greater than or equal to the width of the stationary mask 440-1. As head 16 moves in the lateral direction, the moving mask 440-1 overlays the stationary mask 440-2 between light source 46 and sensors 440-1, 440-2. For a mask pattern comprising a checkerboard pattern, the overlay of a moving mask 440-1 row over a stationary mask 440-2 row is detected by the optical sensors 444-1, 444-3. Each row crossing may correspond to a data track crossing, thereby providing an indication of lateral position of head 16 to sensors 444-1, 444-3. As tape 100 moves laterally, the light is obstructed to sensors 444-1, 444-3. The total light reaching the sensors 444-1, 444-3 through the masks 440-1, 440-2 corresponds to lateral tape motion, i.e., the total overlay of the tape 100 over the sensors 444-1, 444-3. Using the information concerning relative position of head 16 to sensors 444-1, 444-3 and lateral tape motion, a controller (not shown) of this example determines relative position of head 16 to tape 100, allowing control of the position of head 16 with respect to tape 100. In particular, the correspondence of the mask rows to data tracks provides fine measurement and control of the relative position of head 16 to the data tracks.

More specifically, the optical paths between light source 46 and two stationary transmissive optical sensing devices 444-1, 444-3 are blocked by the image of the edge of tape 100, and two pattern encoded mask bars 440-1 and 440-2, one attached to the moving read/write head 16 and the other stationary with respect to the optical sensing devices. Sensing devices 444-1, 444-3 provide two position signals as the read/write head 16 moves laterally with respect to tape 100. The two position signals are complementary to each other (e.g., 180 degrees out of phase) and quantized in nature to provide direction and magnitude of an offset.

FIGS. 4B and 4C illustrate patterns included with both masks 440-1 and 440-2 in greater detail over varying offset positions. The stationary mask 440-2 has two sections (a, b) positioned side-by-side along the direction of tape transport, each section having a checkerboard pattern with black (optical blocking) and white (optical transparent) blocks, sections a and b. Each section a, b is the mirror image of the other section about the y-axis. In one example, the size of the square or rectangular block of the checkerboard pattern can be associated with data track widths, e.g., a subdivision or multiple of the data track width. Those of ordinary skill in the art will recognize that shapes other than squares may be employed such as rectangles, triangles, circles, and the like.

In one example, the dimensions of the squares are chosen to be 0.5 data track widths. Each section of the stationary mask 440-2 blocks, at least partially, the optical path of one of the two sensors 444-1, 444-3 (shown as circles in FIG. 4C). The moving mask 440-1 may have a homogeneous checkerboard pattern with the same square block dimensions as the stationary mask. In one example, mask 440-1 is wider than mask 440-2 and head 16, but in other examples mask 440-1 may have various sizes including equal to or smaller than mask 440-2 in the lateral direction.

FIG. 4C illustrates several alignments (shown as i, ii, iii, and iv) of masks 440-1, 440-2 and the edge of tape 100 as head 16 (not shown in FIG. 4C) and mask 440-1 move across the width of tape 100. As illustrated in FIG. 4C, each optical sensing element goes through a cycle of being semi-blocked by the two masks 440-1, 440-2 and tape 100 as the black and transparent squares line up to respective black and transparent squares, to being completely blocked as the black and the transparent squares of the moving mask 440-2 line up to respective transparent and black squares of the stationary mask 440-1. Note that because the stationary mask 440-2 sections are complementary, one sensor experiences minimum light transmission while the other sensor experiences maximum light transmission. Since the optical path for both sensors experiences cycles of maximum light transmission to minimum light transmission for each track length's motion of the head, the resulting positioning signals generally have a wider dynamic range (and better signal-to-noise, ratio) than previous servo systems. With proper signal processing, as will be apparent to those of ordinary skill in the art, the system provides a null position signal for each row of squares shown in FIG. 4C.

In one example, if signals b1 and b3 represent the outputs of sensors 444-1 and 444-3, respectively, signal b1−b3 represents a signal proportional to the position of the read/write head 16, and signal b1+b3 represents a signal proportional to the position of tape 100 (i.e., related to LTM). Using well known servo system techniques, a servo controller may use the sum and difference signals to determine and control the position of the read/write head 16 relative to the edge of tape 100.

Figure 5:
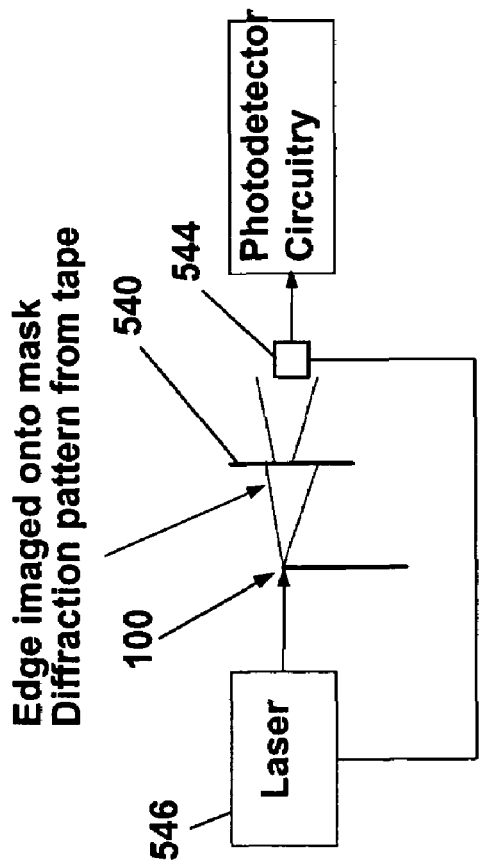
FIG. 5 illustrates another exemplary servo system including an optical servo system configured to sense the edge of a storage medium.

According to another example, an optical servo system illuminates an edge of a storage tape and creates a diffraction pattern. The diffraction pattern is imaged onto a suitable mask and the output of the mask is detected and used to determine the position of the edge of the storage tape. FIG. 5 illustrates an exemplary optical servo system wherein an optical source 546 illuminates an edge of a storage tape 100 to create a diffraction pattern to provide servo information. Operation of the exemplary servo system may be described by following the light path from left to right in FIG. 5. Light source 546, e.g., a laser, provides illumination that diffracts over tape edge 100, creating a diffraction pattern, which is imaged onto and passes through mask 540 creating an output mask diffraction pattern. The output diffraction pattern is detected by sensor 544 and may be processed to provide relative positional information of tape 100 within the system.

In one example, light source 546 includes a coherent light source, e.g., a laser diode or the like. Sensor 544 may include any suitable optical sensor array or line scanner such as a CCD or CMOS device. Light source 546, sensor 544, and mask 540 may be mechanically fixed in a known physical relationship relative to tape 100 and a head actuator (not shown).

Figure 6:
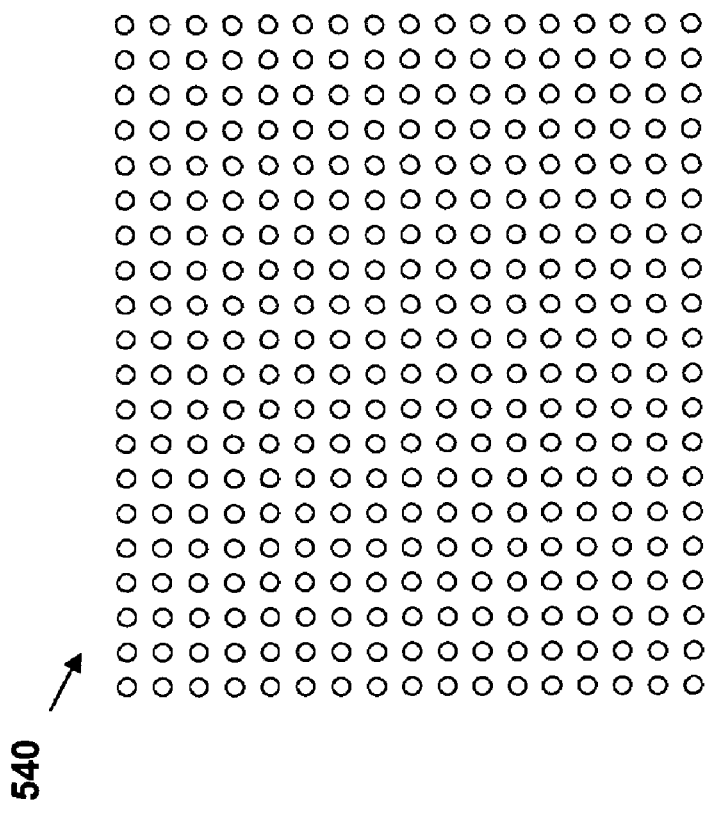
FIG. 6 illustrates an exemplary mask pattern for use in an optical servo system.

In one example, mask pattern 540 includes four bands of holes, one of which is illustrated in FIG. 6. In one example, the mask includes a hole or transmissive pattern having a pitch of 24 µm and a diameter of 12 µm. It will be recognized that various other dimensions and mask patterns may be used, e.g., another mask pattern that may be used includes lines in the longitudinal direction with suitable spacing and dimensions to provide direction and relative motion information. The pattern on mask 540 may be one dimensional, comprising elements such as lines with suitable width and spacing, or a grating line pattern for increased light transmission. Additionally, a mask may include a pattern of varying transmissive materials to the light source.

When light diffracts over the edge of tape 100 and a diffraction pattern is projected and imaged onto the actuator mask 540, movement of mask 540 or light source 546 does not shift the diffraction pattern; rather, the movement creates an intensity change in the diffraction pattern, as measured by detector(s) 544. Maximum intensity occurs when the tape edge diffraction pattern covers or matches the actuator mask 540 pattern. As mask 540 is moved laterally with respect to the edge of tape 100 two effects are observed: a slowly increasing intensity change; and a faster sinusoidal intensity change corresponding to each track crossing of the tape edge diffracted pattern with the actuator mask diffraction pattern.

Figure 7:
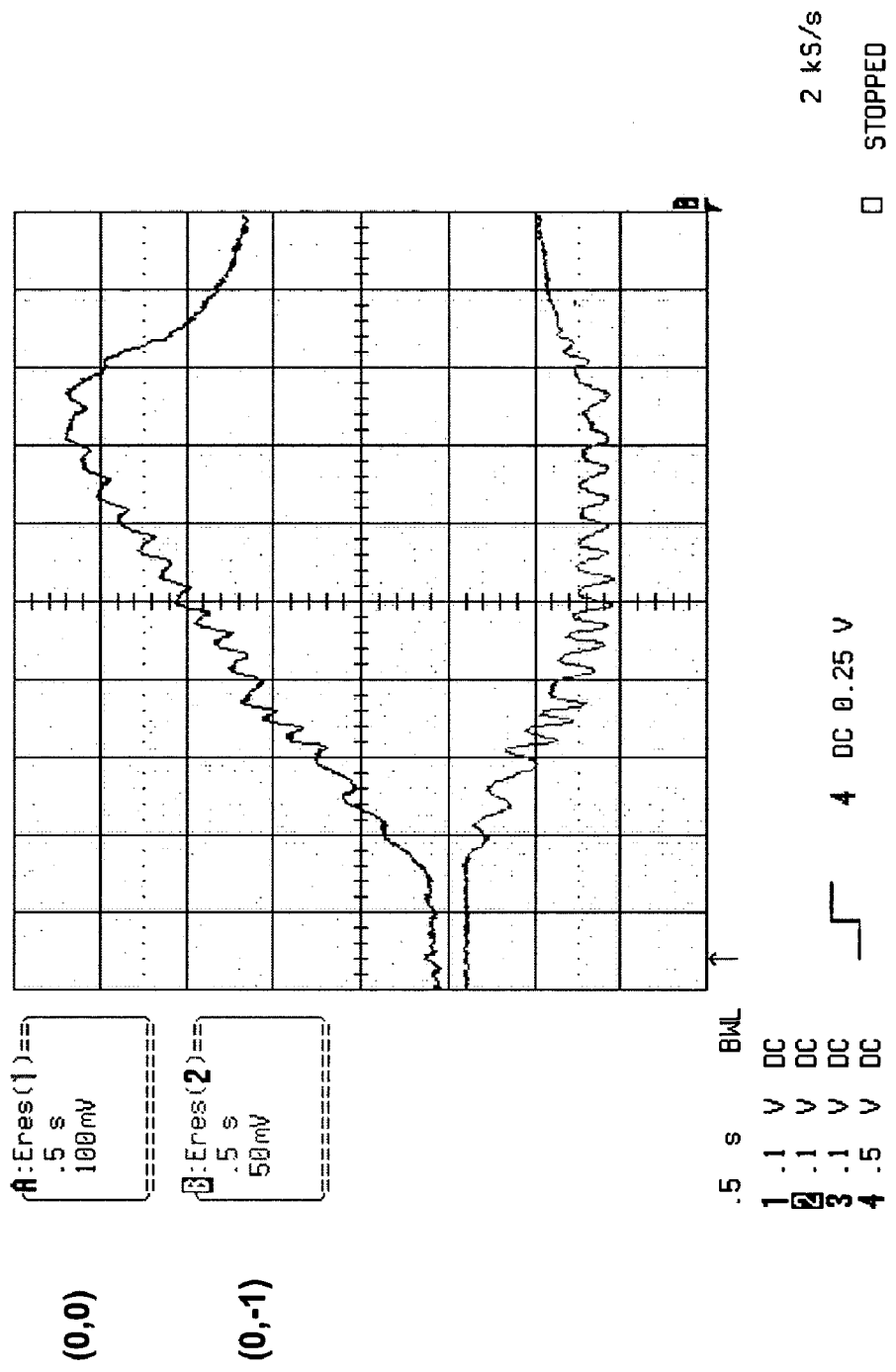
FIG. 7 illustrates an exemplary signal detected from an optical servo system.

From the output mask diffraction pattern, two of the orders (0, 0) and (0, −1) provide light levels that are out of phase with each other as a function of tape 100 or mask 540 lateral motion. The geometry of the system, e.g., the distance from the edge of tape 100 to mask 540, and the distance from mask 540 to detector 544, may be adjusted to provide varying amounts of phase difference between the two orders (0, 0) and (0, −1). In one example, the phase difference of the servo system is 90 degrees out of phase, e.g., as is the case with sine and cosine waveforms. It will be recognized by those of ordinary skill in the art that by using two waveforms that are 90 degrees out of phase both relative position and direction of motion of tape 100 to the transducer head may be derived. In one example, two photodetectors, one for each order of the diffraction pattern, allow the signals to be detected simultaneously. FIG. 7 illustrates scope traces displaying two orders in one example.

Provided mask 540 and the edge of tape 100 are properly aligned, there will be a single maximum light intensity track crossing. This maximum intensity track crossing occurs when the tape edge diffraction pattern is matched over the mask pattern. This signal is the reference point from which tracks can be determined. In the exemplary scope trace shown in FIG. 7, the maximum intensity track occurs on track 17.

It should be recognized by those of ordinary skill in the art that the exemplary servo methods for sensing the position of a tape edge are illustrative only and various modifications (including additions and subtractions of devices or actions) to the above methods and systems are possible. Additionally, various methods and systems may be used in combination with other optical tape edge servo methods and systems.

Magnetic Servo Methods and Systems:

Exemplary magnetic servo methods and systems that may be used in conjunction with optical servo methods and systems using the tape edge will now be described. According to one example, methods and systems are provided for sensing existing data structures on a magnetic storage tape to determine position information of the transducer head, e.g., using read signals from a reference data track. In one exemplary method, a first data track is written to a magnetic storage medium based on the ability of the drive system to maintain track position, e.g., through "open loop" control or other servo control methods, e.g., optical servo systems, available to the drive system. Subsequent data tracks are referenced from one or more existing or previously written data tracks (referred to herein as a "reference" data track). The first data track, n, becomes a reference track for the next adjacent track, n+1. As each successive data track is written a sensor, e.g., a read element, may continuously or intermittently monitor at least one previously written reference track(s) to provide relative position information. For example, if the read element and write element are fixed with respect to each other for a desired track width and spacing, a read signal indicating that the read element is drifting or offset from the reference track indicates to the servo system that the track being written is also drifting or offset from a desired position relative to the reference track.

Signals that can be used to determine the tracking information include, e.g., track average amplitude, average energy of the reference track, average energy of the read gate (or "rdgate") signal, PLL-locked/unlocked, transition from readable to unreadable data, k-bit, error rate information, signal noise, and other suitable read/write parametrics that change as a function of track offset as discussed above.

One exemplary servo method is described with reference to FIG. 8. In this example, at least one data track n−1 is written to storage medium 100 and aligned on storage medium 100 based on the ability of the servo system of the drive. The position of a subsequently written data track n is referenced, at least in part, by positioning one or more servo read elements 120 in a known relationship to the previously written data track n−1, e.g., aligned near a far edge of the adjacent data track n−1. Write element 105 and data read element 110 are adjusted or moved based on signals from servo read element 120 to reduce variations in the relative position of write element 105 and track n relative to track n−1. Other servo systems available to the drive system may also be used in parallel or serial fashion to provide positional information.

In one example, if track n−1 can be successfully read by servo read element 120 (e.g., within desired error rates, etc.), then track n is correctly positioned with respect to track n−1, i.e., track n is not overwriting track n−1. If track n−1 cannot be successfully read, then the head 110 is repositioned to move track n away from track n−1. When track n−1 is successfully read, write element 105 may be moved slightly closer to track n−1 to reduce spacing between track n and track n−1, which may be followed by another read to ensure that track n−1 is not being written over. The process of reading track n−1 with servo read element 120 and making adjustments of write element 105 may be performed continuously or intermittently, attempting to keep track n and n−1 to a desired width and spacing. In one example, the pitch of data tracks is in the range of approximately 1 µm and 44 µm. Track widths may vary depending on the particular application, desired storage density, error rates, and the like.

According to another example, a read element is aligned with adjacent edges of two reference data tracks to obtain positional information. A write element may be adjusted based on signals from the read head corresponding to gap phases of the two reference data tracks. For example, positional information may be acquired by monitoring the amplitude during the gap phase of two adjacent reference tracks and comparing the amplitude to the amplitude of random data.

With reference to FIG. 9A, after two data tracks n−1 and n−2 are written on magnetic storage medium 100, an active data track n is written with reference to previously written data tracks n−1 and n−2. For example, after data tracks n−1 and n−2 have been written on the storage tape, and while writing track n with write element 205, servo read element 220 straddles the border between the previous data tracks n−1 and n−2. The amplitude of the read signal from track n−1 taken during gaps 160 between data blocks 170 may be used to determine the relative position of track n compared to tracks n−1 and n−2.

For example, if the signal samples of gaps are relatively constant, servo read element 210 is positioned substantially equally over tracks n−1 and n−2. If the signal samples vary read element 210 is likely positioned unequally over one track. FIG. 9B illustrates a nominal read signal envelope of the signal from servo read element 220. When write element 205 and data read element 210 are centered on track n, and the servo read element 220 is positioned only over data, the read signal is at maximum amplitude. When the servo read element 210 is positioned over a gap 160 from either track n−1 or n−2, the read signal will be at half maximum amplitude because half of read element 210 is positioned over a gap 160.

FIG. 9C illustrates the servo read signal when servo read element 210 is positioned off-track. When write element 205 is positioned off-track and servo read element 210 is not positioned equally over track n−1 and track n−2, the servo read signal envelope contains alternating gap modulation depths because the amplitude is reduced by more than half of the maximum by gaps 160 associated with one of the tracks and by less than half of the maximum by gaps 160 associated with the other track. Write element 205 may be adjusted such that the gap modulation depth from the read signal is consistent and equal for each encountered gap 160.

The amplitude of the signals may be monitored intermittently or continuously to provide information to a servo system to keep the head in a desired position with respect to track n−1.

Figure 10:
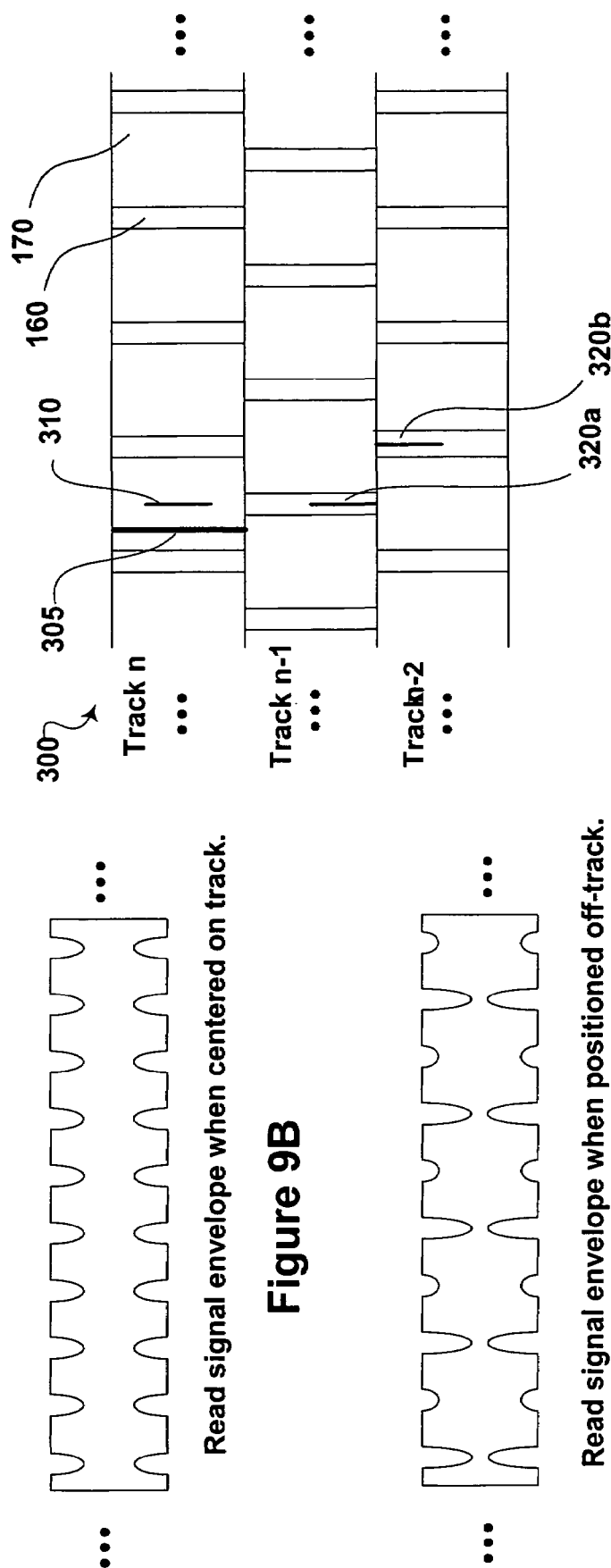
FIG. 10 illustrates another exemplary magnetic head assembly relative to a magnetic storage medium and corresponding read signals during a servo process.

FIG. 10 illustrates another exemplary method, where two servo read elements 320a and 320b are aligned with and straddle adjacent edges of two reference data tracks n−1 and n−2. Write element 305 may be adjusted based on read signals from the two servo read elements 320a and 320b. The amplitude of read signals from servo read element 320a and 320b during gaps 160 indicates a magnitude and direction of the offset. The relative amplitudes of the signals from read heads 320a and 320b from gaps 160 in track n−1 and track n−2 are compared. If the ratio of the signal amplitudes is 1, then the position of the active track n, is positioned correct. If the ratio is not 1, then the head is repositioned in the appropriate direction. For example, greater amplitude for one read head indicates the direction of offset. The read signals may be sampled or measured continuously or intermittently, and used by the controller to position the write head in a desired position with respect to tracks n−1 and n−2.

Various combinations of the exemplary methods described herein are contemplated including different numbers and configurations of servo read elements. For example, a system may include a first servo read element configured to read a reference data track and a second servo read element configured to straddle two adjacent reference tracks thereby providing a first signal that varies as a function of track offset and a second signal that detects gap amplitudes indicating track offset.

According to another exemplary method and system, a read/write head halts a read/write process at a predetermined time and the head assembly is moved to locate an edge of a reference data track. The system may then register the location and boundaries (e.g., edges) of the reference data track relative to the active track and make adjustments to the position of the active track based on predetermined values or signals from the read head. The process of halting and checking the location of a reference data track may be periodically repeated as desired during writing a data track. For use in a magnetic tape drive, this example can be implemented to obtain accurate and repeatable positioning information.

Figure 11:
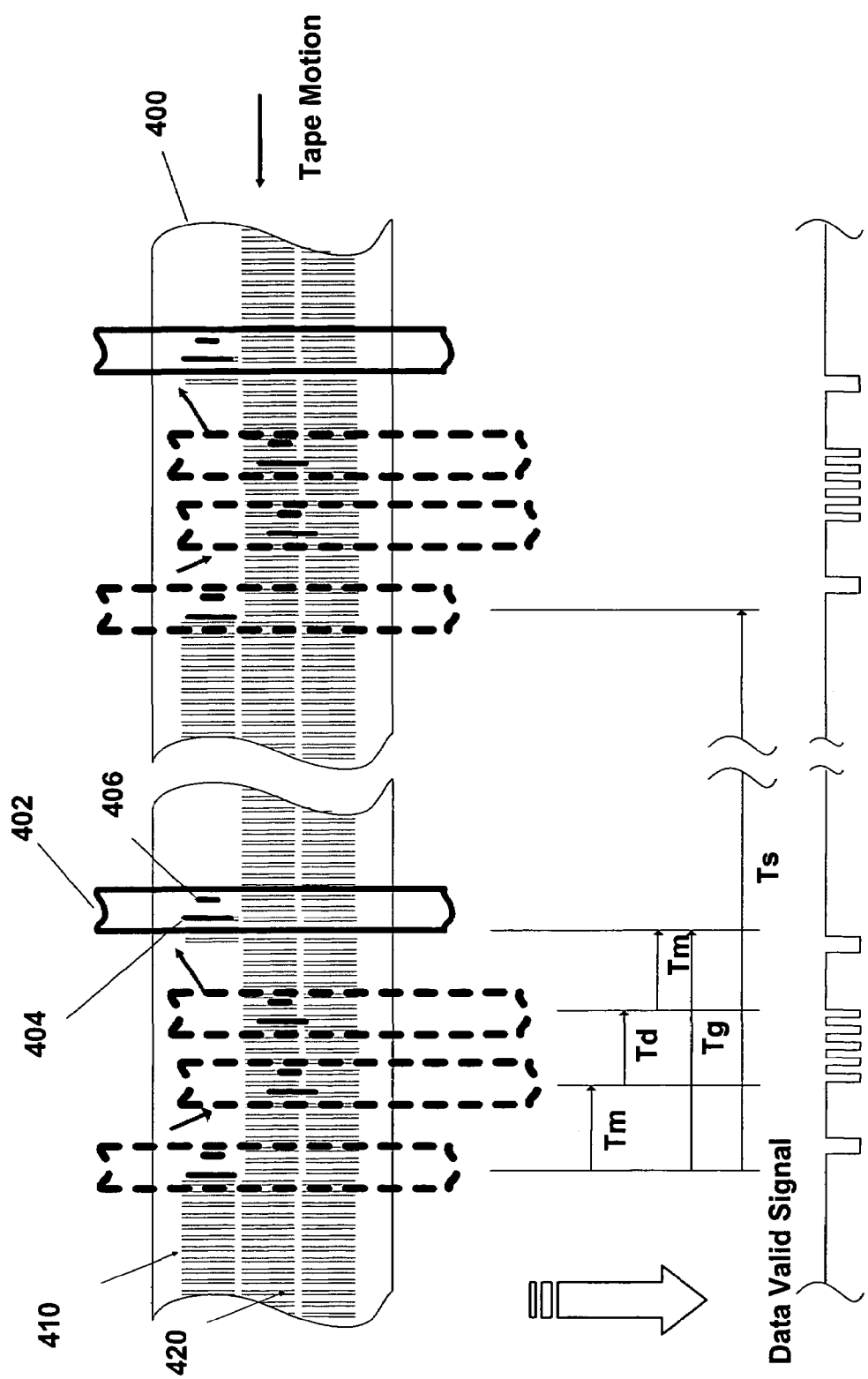
FIG. 11 illustrates an exemplary magnetic head assembly relative to a magnetic tape and associated signals generated during a servo process.

With reference to FIG. 11, an exemplary method for determining relative position information during a write process is described. For a given geometry of read/write head 402, a drive servo system can read a previously written reference data track 420 and obtain information to fine adjust the position of head 402 over active track 410 (i.e., the track being accessed for either writing or reading data). In one example, the system uses data integrity read signals such as Read Channel Data Validity Resources of the tape drive and signal quality metrics of read element 406 when positioned over reference track 420. A read signal quality metric may be monitored as head 402 including reference head 406 pass over reference track 420. The relative layout of the central position and/or edges of reference track 420 with respect to the location of the active track 410 may assist the drive servo system to adjust the position of head 402 over track 410.

In one example, the Read Channel Data Validity Resources ("RCDVR") provide a relay type signal (ON/OFF), referred to as a "Data Valid" signal (FIG. 11 "Data Valid Signal"), representative of the ability of the read element 406 to recover data based on any, or combination of any, of the following data validity indicators and signals:

1. Data amplitude valid
2. Data frequency/Phase valid (phase lock loop valid)
3. Data Block's Pre-amble/Post-amble amplitude and or phase/frequency and or sync signal valid
4. Data pattern Valid
5. Data Block's Pre-amble/Post-amble pattern valid.

The lower portion of FIG. 11 illustrates an exemplary read signal received from head 402 that may determine the relative position of head 402 during operation. As the read element 406 of head 402 moves across the reference track 420, the data valid signal changes its state from "OFF" near the edge of reference track 420 where data is not valid to "ON" where the data become valid and back to OFF where the read element crosses the opposite edge of reference track 420. To check the track layout dimensions and to position read element 406 over reference track 420, the servo system may halt the read/write function over the active track 410 at specified time period (Track Layout Check period: Ts as shown in FIG. 11) and initiate a seek to and over the edges of reference track 420. By monitoring the state of the data valid signal and instantaneous relative position of head 402 with respect to the active track 410 location provided by the servo position-sensing device, the servo system registers the location and boundaries of reference track 420 relative to active track 410. This registered value referred to as "Reference Position" is compared to a nominal value. If there is no difference then track layout is correct and the servo system may initiate another seek back to active track 410 to resume read/write functions with no further action until the next Track Layout Check time Ts. If there is a difference between the measured reference position and its nominal value, however, indicating a change in track layout or change in relative position of tape 400 and head 402, then the servo system will initiate another seek back to active track 410 and modify the reference position of the servo positioning loop to correct the track layout back to the nominal dimensions. The system then resumes read/write functions until the next Track Layout Check time Ts.

Since data is not retrieved from or written to active track 410 during a data track layout check in this particular example, periodic gaps without data are created within the data pattern, the length and duration of the gaps ("Tg") are determined by the duration of motion to and from the reference track ("Tm") and the time to accurately resolve the Data Valid information from the reference track ("Td"). The frequency rate of these gaps (Fs=1/Ts) determines correction bandwidth capability of this method and also the overhead to tape capacity. Generally, a higher frequency rate of track layout checks allows for faster correction, but reduces data capacity of the storage medium.

Those of ordinary skill in the art will recognize that the exemplary methods may be carried out alone or in any combination of firmware, software, and hardware associated with a drive system.

According to another exemplary method, the read/write process is halted and a dedicated read element is moved to locate an edge of a reference data track during a read/write process of an active track. The system may register the location and boundaries of the reference data track relative to the active track and make adjustments to the position of the active track based on predetermined values or signals from the read element as described above. The process of halting and checking the location of a reference data track may be periodically repeated as desired during writing a data track.

Figure 12:
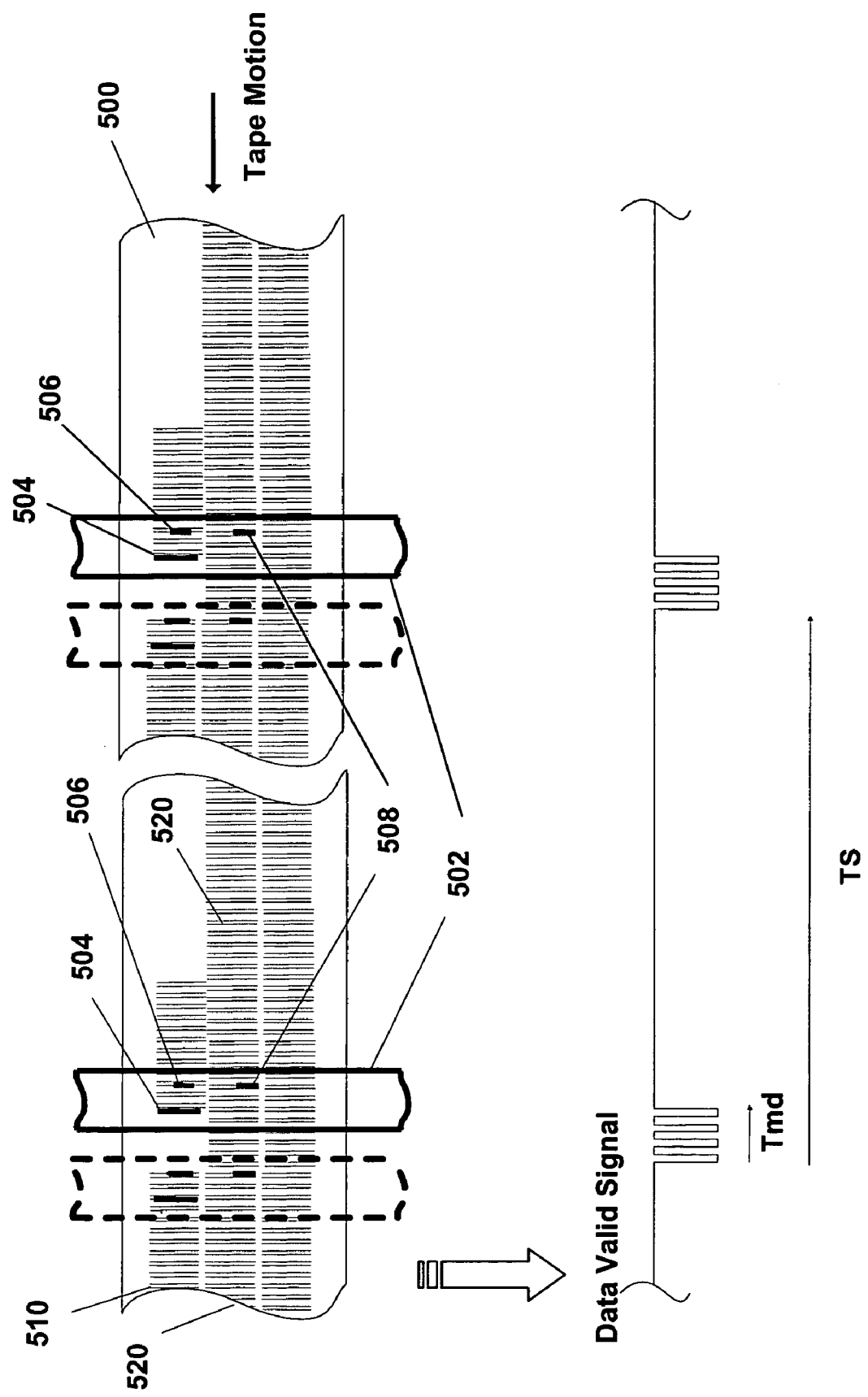
FIG. 12 illustrates another exemplary magnetic head assembly relative to a magnetic tape and associated signals generated during a servo process.

The example of FIG. 12 is similar to the example of FIG. 11 except that a dedicated servo read element 508 is included with head assembly 502. Servo read element is positioned adjacent an edge of reference track 520 and therefore requires less movement of head 502 and time to reference one or more edges and/or the center position of reference track 520. In one example, the method and system uses RCDVR signals from dedicated servo read element 508 to determine the location of the active read element 506 and write element 504 with respect to the edge of reference track 520. The positional information is then used to assist the servo system to adjust the read element 506 and write element 504 over active track 510.

According to another exemplary method, a dedicated read head provides a continuous read signal associated with the relative position of a reference data track with the location of the active track. The servo system may use the position information to adjust the position of the write head to a desired relative position with the reference data track.

Figure 13:
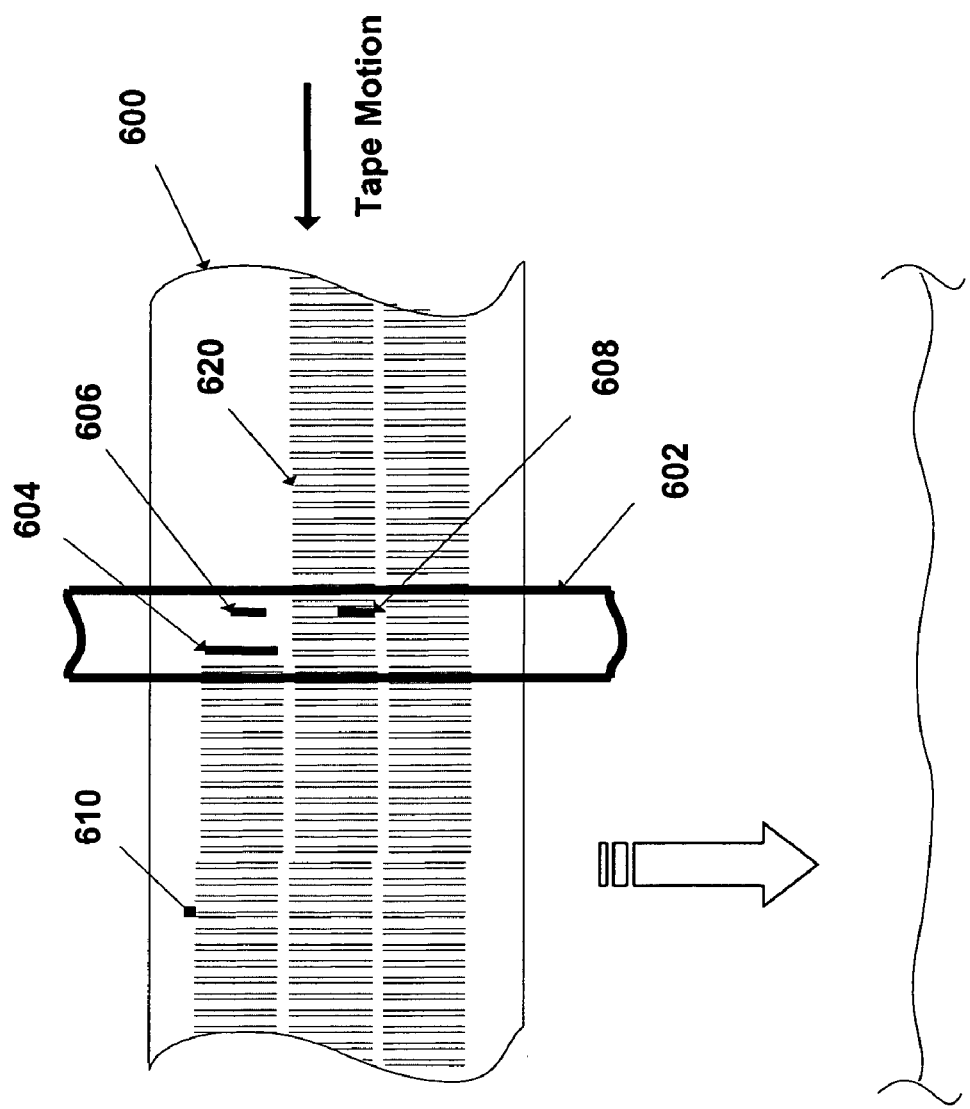
FIG. 13 illustrates another exemplary magnetic head assembly relative to a magnetic tape and associated signals generated during a servo process.

The example of FIG. 13 is similar to the example of FIG. 12 except that dedicated servo read element 608 provides a continuous signal associated with the position of servo read element 608 relative to reference track 620. Accordingly, in this example, the servo system may make continuous position determinations and continuous adjustments to the position of head 602.

As the read element 608 moves across the edge of the reference track 620, the read signal (or data valid signal) provides a linear signal proportional to the relative position of servo read element 608 to the edge of reference track 620. The read signal is used as a feed back positioning signal to enforce the tracking of the edge of reference track 620 by the servo read element 608. The design of head 602 is such that, when servo read element 608 tracks the edge of reference track 620 the active read element 606 and write element 604 are positioned over active track 610. Accordingly, the exemplary method supplies the servo system with a servo read signal for positioning head 602 over desired track positions, laid out alongside and parallel to a previously written or reference track.

EXAMPLE II

In one example of the above method, firmware was written for a SDLT220 tape drive manufactured by Quantum Corporation. The firmware utilized the optical tracking servo system of the SDLT220 with "assistance" from reading the edge of an adjacent reference track. A Read Gate signal is generated by the SDLT220 read channel that indicates whether the read channel has read a good block of data. If the Read Gate signal is greater than a predetermined value, then the data block was good. Conversely, if the Read Gate signal is below the predetermined value, then the data block was bad.

Several data tracks were written in standard SDLT220 mode. The data tracks were then read. After the SDLT220 optical servo locked the head onto the center of a data track, the Read Gate signal was sampled by the servo system at a frequency of 10 KHz for 7.5 milliseconds. If the majority of the samples were good, then an offset was added to the current optical servo position to move the head farther from the center of the Active Track. If the majority of the samples were bad, then an offset was added to the current optical servo position to move the head closer to the center of the Active Track. This procedure of sampling the Read Gate signal and then adding or subtracting an offset to the current optical servo position was repeated continuously along the length of tape. The head gradually moved to the edge of the Active Track and continued to follow the edge of the Active Track along the length of the tape.

A subsequent test was performed where several data tracks were written using standard SDLT220 optical servo system, but a 10 Hz sinusoidal frequency was injected into the optical servo signal path, causing the servo to write the data tracks with a 10 Hz sinusoidal deviation from the nominal position. When the data tracks were then read using the method described above, the head followed the 10 Hz signal that was injected during the write process.

Various exemplary transducer heads that may be used with one or more of the above described methods and systems. One exemplary head design includes a center tapped head having two read elements where one read element includes a dedicated read element positioned to derive servo positioning information from an adjacent data track. For example, a first read element reads data on the currently active desired track while a second read head provides servo position information from the adjacent reference data track.

Figure 14:
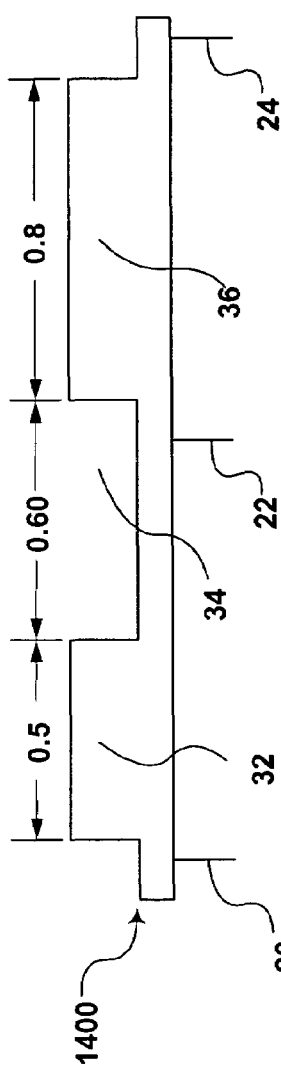
FIGS. 14–18 illustrate various exemplary magnetic head configurations.

FIG. 14 illustrates an exemplary center tapped head 1400 with two effective read elements 32 and 36. In operation, read element 32 is configured to be positioned on the center of an active track and is approximately 0.50 track widths. Read element 36 is approximately 0.8 track widths and separated 0.60 track widths away from read element 32 by recess 34. Read element 36 is configured to be positioned on the reference track center. The dimensions of the second read element 36, in this example 0.8 track widths, are at the limits of track qualifiers, which are used for fine track positioning. The portion of head 1400 including read elements 32 and 36 includes one magneto-resistive strip. The electrical connections of head 1400 are such that the data read element lead 20, and the servo read element lead 24, are independent from the common lead 22.

Figure 15:
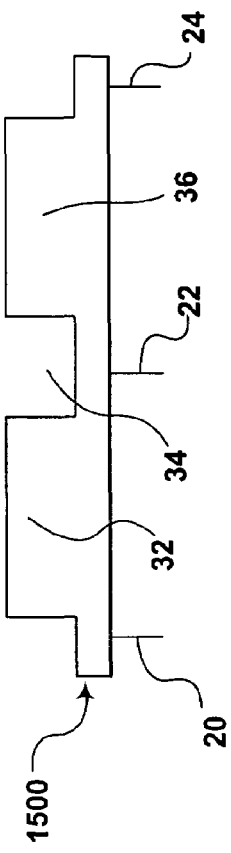

FIG. 15 illustrates an exemplary head 1500. In this example, head 1500 is center tapped with two read elements 32 and 36, where read element 32 is 0.5 track widths and positioned at the center of the active track, and read element 36 is also 0.5 track widths and separated 0.25 track widths away from read element 32 by recess 34. In this configuration, read element 36 may be aligned with the reference track edge and sense track qualifiers or the like to provide positioning information for the servo system.

Figure 16:
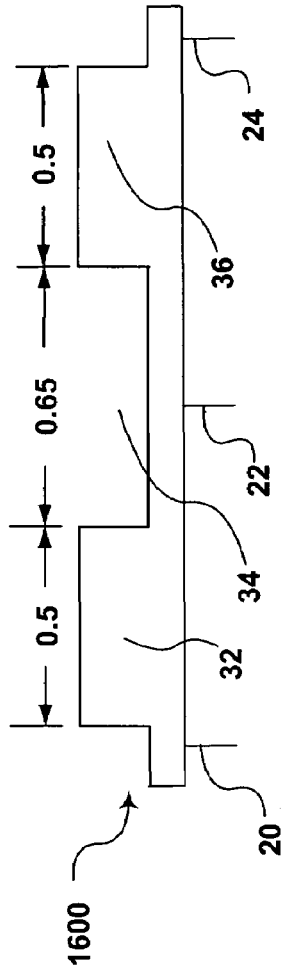

FIG. 16 illustrates an exemplary head 1600. In this example, head 1600 is center tapped with two read elements 32 and 36. The configuration of head 1600 is similar to FIG. 15, except that recess 34 is 0.65 track widths such that read element 36 is configured to be aligned with the opposite edge of a reference track.

Figure 17:
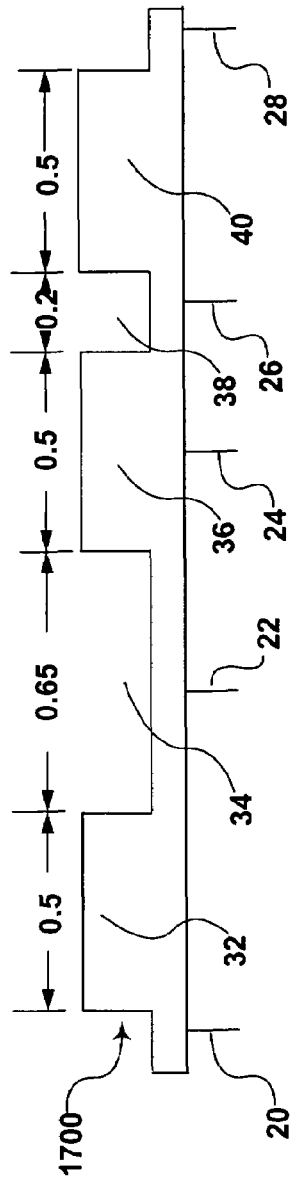

FIG. 17 illustrates an exemplary head 1700 with multiple taps and multiple read elements. Head 1700 includes three read elements 32, 36, and 40 separated by recesses 34 and 38. The first read element 32 is for reading the active track and is positioned nominally at track center. The second read element 36 is positioned near a reference track edge, e.g., on the edge of track n−1 near edge n−2. The third read element 40 is positioned on a second reference track, e.g., on the edge of track n−2 near n−1. Head 1700 may be used is a push-pull configuration with two read elements sensing servo qualifiers from the track edge at the n−1 and n−2 boundary. Head 1700 further includes common lead 22 and read element lead 26.

Figure 18:
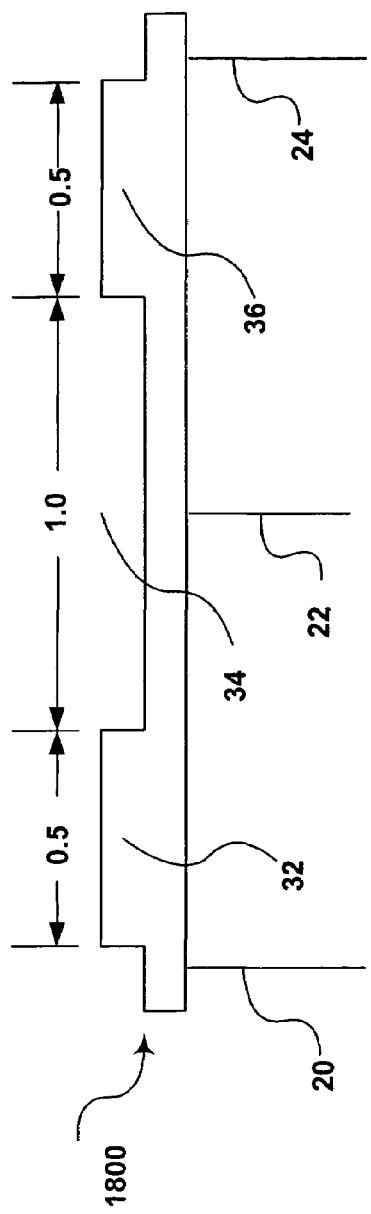

FIG. 18 illustrates another exemplary head 1800. The data read element 32, having a width of 0.5 track widths is positioned 1.5 track widths away from the center of servo read head 36. The separation formed by recess 34 between the read element 32 and read element 36 is 1.0 track width. The exemplary head 1800 may form one magneto-resistive strip of a multi-head channel as described below.

Figure 19:
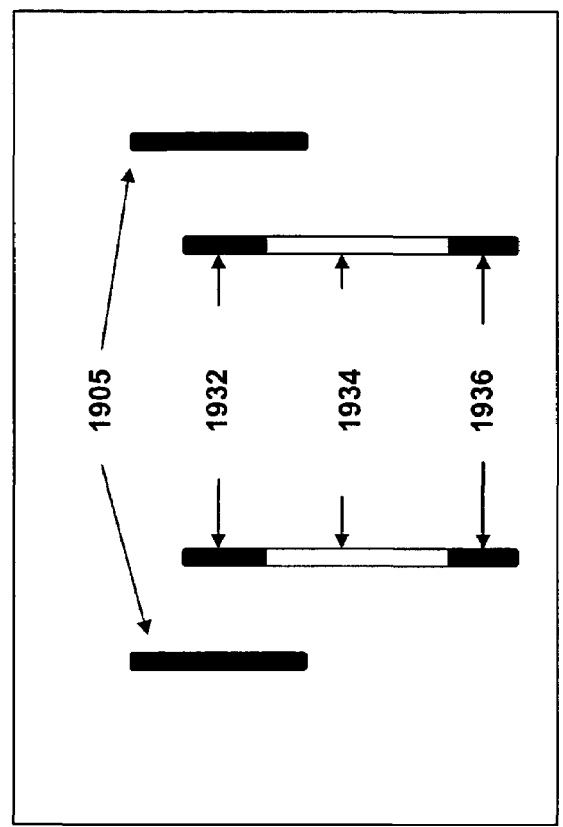
FIG. 19 illustrates one channel of an exemplary read-write multi-channel head.

FIG. 19 illustrates the relative geometry of a typical read-write multi-channel head using the center tapped data and servo read element. In particular, write elements 1905 are shown in relation to data read elements 1932 and servo read elements 1936 for one channel.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A method for positioning a transducer head relative to a magnetic storage medium, comprising:
    writing data tracks to a magnetic storage medium with a transducer head;
    generating a read signal from a read element of the transducer head, the read signal in response to the last previously written data track;
    optically sensing a position of an edge of the storage medium; and
    repositioning the transducer head relative to the storage medium in response to the read signal and the position of the edge of the storage medium.

2. The method of claim 1, wherein a characteristic of the read signal varies as a function of offset between the reference track and the read element.

3. The method of claim 2, wherein the characteristic includes one or more of an error signal value, noise signal, average amplitude, average energy, k-bit value, and error rate value.

4. The method of claim 1, wherein the read signal includes a signal quality parametric that varies as a function of offset between the read element and the reference data track, and the transducer head is repositioned based on the signal quality parametric.

5. The method of claim 1, wherein the read element is a dedicated servo read element configured to read a reference data track as the transducer head access an active data track.

6. The method of claim 1, further comprising writing a data track adjacent the reference data track.

7. The method of claim 1, wherein optically sensing the position of the edge of the storage medium, comprises:
    illuminating a window formed by a transmissive portion of a mask and an edge of the storage medium, wherein the mask is in a fixed spatial relationship to the transducer head; and
    detecting an intensity of light passing through the window.

8. The method of claim 7, repositioning the transducer head based on the intensity of the detected light passing through the window.

9. The method of claim 7, wherein the transmissive portion of the mask includes an aperture.

10. The method of claim 7, further comprising illuminating a second window formed by a second transmissive portion of the mask and a second edge of the storage medium.

11. The method of claim 7, further comprising:
    illuminating a third window formed by a third transmissive portion of the mask having a width greater than the width of the storage medium and opposing edges of the storage medium; and
    detecting an intensity of light passing through the third window.

12. The method of claim 1, wherein optically sensing the position of the edge of the storage medium, comprises:
    illuminating a first mask and a second mask; and
    detecting an intensity of light passing through the first mask and the second mask with a detector, wherein the first mask is stationary with respect to the transducer head, and the second mask is stationary with respect to the detector.

13. The method of claim 12, wherein the detector has at least two sensing elements.

14. The method of claim 12, wherein one of the first mask and the second mask includes two spatially complementary patterns, and the other of the first mask and the second mask includes a pattern corresponding to one of the spatially complementary patterns.

15. The method of claim 12, wherein one of the first mask and the second mask includes a pattern of transmissive sections and non-transmissive sections.

16. The method of claim 1, wherein optically sensing the position of the edge of the storage medium, comprises:
illuminating an edge of the storage medium thereby creating a diffraction pattern;
imaging the diffraction pattern onto a mask; and
detecting the diffraction pattern after passing through the mask.

17. The method of claim 16, repositioning the transducer head based on a characteristic of the detected diffraction pattern.

18. The method of claim 1, wherein the data track comprises user data.

19. A head positioning servo system, comprising:
a transducer head including a read element and a write element;
a light source for illuminating an edge of a magnetic storage medium;
a detector for detecting light from the light source illuminating the edge of the magnetic storage medium; and
a controller for adjusting the position of the transducer head in response to the detected light and a read signal from the read element, the read signal in response to a data track stored on the magnetic storage medium, wherein the data track comprises the last previously written data track recorded by the write element of the transducer head.

20. The system of claim 19, wherein the read element is in a spatially fixed relationship to a write element such that alignment of the read element with at least a portion of the reference data track aligns the write element adjacent the reference data track.

21. The system of claim 19, wherein a characteristic of the read signal varies as a function of offset between the reference track and the read element.

22. The system of claim 20, wherein the characteristic includes one or more of an error signal value, noise signal value, average amplitude, average energy, k-bit value, and error rate value.

23. The system of claim 19, wherein the read signal includes a signal quality parametric that varies as a function of offset between the read element and the reference data track.

24. The system of claim 19, further comprising an optically encoded mask disposed between the light source and the detector.

25. The system of claim 19, further comprising a first mask and a second mask disposed between the light source and the detector, wherein the first mask is stationary with respect to the transducer head and the second mask is stationary with respect to the detector.

26. The system of claim 19, further comprising a mask positioned to create a window formed by a transmissive portion of a mask and an edge of the storage medium, wherein the mask is in a fixed spatial relationship to the transducer head, and the detector detects an intensity of light passing through the window.

27. The system of claim 26, wherein the controller adjusts the position of the transducer head in response to the intensity of the detected light passing through the window.

28. The system of claim 26, wherein the transmissive portion of the mask includes an aperture.

29. The system of claim 26, further comprising a second window formed by a second transmissive portion of the mask and a second edge of the storage medium.

30. The system of claim 26, further comprising a third window formed by a third transmissive portion of the mask having a width greater than the width of the storage medium and opposing edges of the storage medium.

31. The system of claim 19, further comprising a first mask and a second mask, wherein the first mask is stationary with respect to the transducer head, and the second mask is stationary with respect to the detector, and the detector detects light an intensity of light passing through the first mask and the second mask.

32. The system of claim 31, wherein the detector has at least two sensing elements.

33. The system of claim 31, wherein one of the first mask and the second mask includes two spatially complementary patterns, and the other of the first mask and the second mask includes a pattern corresponding to one of the spatially complementary patterns.

34. The system of claim 31, wherein one of the first mask and the second mask includes a pattern of transmissive sections and non-transmissive sections.

35. The system of claim 19, further including mask having a diffraction pattern, the detector detects light diffracted from the edge of the tape and imaged onto the mask.

36. The system of claim 19, wherein the data track comprises user data.

* * * * *